US011204452B2

(12) United States Patent
Paniagua Dominguez et al.

(10) Patent No.: US 11,204,452 B2
(45) Date of Patent: Dec. 21, 2021

(54) DIFFRACTIVE OPTICAL ELEMENT AND METHOD OF FORMING THEREOF

(71) Applicant: Agency for Science, Technology and Research, Singapore (SG)

(72) Inventors: Ramon Jose Paniagua Dominguez, Singapore (SG); Egor Khaidarov, Singapore (SG); Arseniy Kuznetsov, Singapore (SG); Hanfang Hao, Singapore (SG); Yefeng Yu, Singapore (SG); Xinan Liang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 334 days.

(21) Appl. No.: 16/333,539

(22) PCT Filed: Oct. 5, 2017

(86) PCT No.: PCT/SG2017/050503
§ 371 (c)(1),
(2) Date: Mar. 14, 2019

(87) PCT Pub. No.: WO2018/067074
PCT Pub. Date: Apr. 12, 2018

(65) Prior Publication Data
US 2019/0257986 A1 Aug. 22, 2019

(30) Foreign Application Priority Data

Oct. 5, 2016 (SG) .......................... 10201608361Y

(51) Int. Cl.
*G02B 5/18* (2006.01)
*B82Y 20/00* (2011.01)
*H01Q 15/02* (2006.01)

(52) U.S. Cl.
CPC .......... *G02B 5/1809* (2013.01); *G02B 5/1847* (2013.01); *B82Y 20/00* (2013.01); *G02B 2207/101* (2013.01); *H01Q 15/02* (2013.01)

(58) Field of Classification Search
CPC ................ G02B 5/1809; G02B 5/1847; G02B 2207/101; G02B 5/008; G02B 1/002; H01Q 15/02; B82Y 20/00
See application file for complete search history.

(56) References Cited

U.S. PATENT DOCUMENTS

2013/0247973 A1* 9/2013 Kim ...................... G02B 5/008
136/256

FOREIGN PATENT DOCUMENTS

WO 2015156737 A1 10/2015
WO 2015180970 A1 12/2015

OTHER PUBLICATIONS

Zhang et al. (Ultra-broadband and strongly enhanced diffraction with metasurfaces, Scientific Reports 2015; 5: 10119). (Year: 2015).*
(Continued)

*Primary Examiner* — Kimberly N. Kakalec
(74) *Attorney, Agent, or Firm* — Winstead PC

(57) ABSTRACT

There is provided a diffractive optical element including a substrate, and an array of optical nanoantennas arranged on the substrate, the array of optical nanoantennas being spaced apart periodically in a lateral direction for supporting a plurality of diffraction orders at a predetermined wavelength. In particular, each optical nanoantenna in the array of optical nanoantennas is configured to control distribution of electromagnetic energy from an incident light having the predetermined wavelength amongst the plurality of diffraction orders so as to promote scattering of the electromagnetic energy in at least a first direction and suppress scattering of the electromagnetic energy in at least a second direction, the first direction and the second direction corre- (Continued)

sponding to a first diffraction order and a second diffraction order of the plurality of diffraction orders, respectively. There also provided a corresponding method of forming the diffractive optical element and a flat optical element, such as a flat lens.

19 Claims, 20 Drawing Sheets

(56) References Cited

OTHER PUBLICATIONS

Zou et al. (Spectral and angular characteristics of dielectric resonator metasurface at optical frequencies, Applied Physics Letters 105, 191109, 2014). (Year: 2014).*
Liu et al., "Fabrication of Blazed Grating by Native Substrate Grating Mask," Optical Engineering, vol. 52, No. 9, Sep. 2013, pp. 091706-1-6.
Levola et al., "Replicated Slanted Gratings with a High Refractive Index Material for in and Outcoupling of Light," Optics Express, vol. 15, No. 5, Mar. 5, 2007, pp. 2067-2074.
Bai et al., "Optimization of Nonbinary Slanted Surface-Relief Gratings as High-Efficiency Broadband Couplers for Light Guides," Applied Optics, vol. 49, No. 28, Oct. 2010, pp. 5454-5464.
Astilean et al., "High-Efficiency Subwavelength Diffractive Element Patterned in a High-Refractive-Index Material for 633 nm," Optics Letters, vol. 23, No. 7, Apr. 1, 1998, pp. 552-554.
Yu et al., "Light Propagation with Phase Discontinuities: Generalized Laws of Reflection and Refraction," Science, vol. 334, Oct. 21, 2011, pp. 333-337.
Lin et al., "Dielectric Gradient Metasurface Optical Elements," Science, vol. 345, No. 6194, Jul. 18, 2014, pp. 298-302.
Yu et al., "High-Transmission Dielectric Metasurface with 2π Phase Control at Visible Wavelengths," Laser & Photonics Reviews, vol. 9, No. 4, 2015, pp. 412-418.
Khorasaninejad et al., "Metalenses at Visible Wavelengths: Diffraction-Limited Focusing and Subwavelength Resolution Imaging," Science, vol. 352, No. 6290, Jun. 3, 2016, pp. 1190-1194.
Abass et al., "Insights into Directional Scattering: from Coupled Dipoles to Asymmetric Dimer Nanoantennas," Optics Express, vol. 24, No. 17, Aug. 22, 2016, pp. 19638-19650.
Staude et al., "Tailoring Directional Scattering through Magnetic and Electric Resonances in Subwavelength Silicon Nanodisks," ACS Nano, vol. 7, No. 9, Aug. 6, 2013, pp. 7824-7832.
Zou et al., "Dielectric Resonator Nanoantennas at Visible Frequencies," Optics Express, vol. 21, No. 1, Jan. 11, 2013, pp. 1344-1352.
Shibanuma et al., "Unidirectional Light Scattering with High Efficiency at Optical Frequencies Based on Low-Loss Dielectric Nanoantennas," Nanoscale, vol. 8, Jun. 29, 2016, p. 14184-14192.
R. Nave, "Diffraction Grating," http://hyperphysics.phy-astr.gsu.edu/hbase/phyopt/grating.html, 2016, pp. 1-3.
The Center for Occupational Research and Development, "Gratings," https://pe2bz.philpem.me.uk/Lights/-%20Laser/info-902-LaserCourse/c06-09/mod06_09.htm, 1988, pp. 1-20.
URS GRAF, "Asymmetric Gratings," https://hera.ph1.uni-koeln.de/~graf/publications/grating_paper/node5.html, Nov. 6, 2001, one page.
Written Opinion of the International Searching Authority for International Application No. PCT/SG2017/050503 dated Nov. 27, 2017, pp. 1-5.
International Preliminary Report on Patentability for International Application No. PCT/SG2017/050503 dated Dec. 18, 2018, pp. 1-23.

* cited by examiner

DIFFRACTIVE OPTICAL ELEMENT AND METHOD OF FORMING THEREOF

CROSS-REFERENCE TO RELATED APPLICATION

This application claims the benefit of priority of Singapore Patent Application No. 10201608361Y, filed 5 Oct. 2016, the content of which being hereby incorporated by reference in its entirety for all purposes.

TECHNICAL FIELD

The present invention generally relates to a diffractive optical element and a method of forming the diffractive optical element, and more particularly, to a flat optical element, such as, but not limited to, a flat optical lens.

BACKGROUND

Flat optical elements (components) are attracting an increasing interest both within the academia and the industry due to their potential impact in a wide range of devices, for example, ranging from sophisticated scientific, medical or aerospace instrumentation to devices in everyday use such as cell phones, for which an imminent applicability both in displays and cameras can be foreseen.

Conventional flat optical elements may comprise sets of inclusions (optical nanoantennas) supported by an interface with inclusion sizes comparable to or smaller than the wavelength of an incident light that allow manipulation of the incident light. Part of the success or appeal of flat optical elements, apart from its small physical footprint and lightweight, comes from its flexibility in mimicking a large number of traditional optical devices, such as lenses, polarizers, polarization beam splitters, and so on. Among these traditional optical devices, lenses may be among the most important, because in traditional optics, they are bulky and heavy optical elements that can be relatively expensive, especially when large sizes are required, such as, traditional lenses mounted in astronomical telescopes.

An important quantity/metric characterizing a lens is its numerical aperture (NA), which determines the minimum size or size of the finest detail ($\Delta$) that the lens can resolve, and may be defined by the formula: $\Delta=\lambda/(2\cdot NA)$, where $\lambda$, is wavelength of the incident light. The NA of a lens is, in turn, limited by its maximum acceptance angle $\theta_{max}$ (e.g., as schematically illustrated in FIG. 1A), and is related to such a maximum acceptance angle by the formula: $NA=\sin(\theta_{max})$. Therefore, the flat optics approach is limited by the maximum bending angle (e.g., $\theta_1$ and $\theta_4$ as schematically illustrated in FIG. 1B) that can be obtained. FIGS. 1A and 1B depict schematic drawings illustrating the operating principles of a traditional lens and a flat-optics lens, respectively.

Conventionally, the bending of the electromagnetic waves has been achieved by designing the different inclusions in such a way that the incident wave experiences different phase retardations (from 0 to $2\pi$) when interacting with each of the inclusions. As a result, the emerging wavefronts sum up to mimic that of a plane wave subtending the desired angle ($\theta$) with respect to the optical device. Under a normally incident light, this angle is related to the physical size ($\Lambda_i$) of the region (e.g., as schematically illustrated in FIG. 1B) occupied by the inclusions mapping the 0 to $2\pi$ (range of phases (may also be referred as a supercell size), and to the wavelength ($\lambda$) of the incident light by the formula $\sin\theta=\lambda/\Lambda$. Thus, the desired angle has a maximal value of $\theta=90$ degrees when such a physical size of the region is exactly equal to the wavelength of the incident light.

To achieve the necessary phase retardation, different conventional strategies or approaches have been adopted, such as using resonant inclusions, inclusions supporting guided modes with different propagating constants, non-resonant inclusions exhibiting an effective index, or utilizing the geometric phase of light. However, a common limitation of all of these conventional approaches based on phase accumulation relates to the maximum bending angle ($\theta_{max}$) that can be achieved. As a general rule, at least two inclusions must be present in the region in which the phase is mapped to produce a bending effect, since a single inclusion would not be able to map the linear phase profile corresponding to a tilted wave (i.e., a wave subtending an angle with respect to the surface on which the inclusions are arranged). This, in turn, limits the minimal size of the region to be the sum of the respective sizes of the at least two inclusions in the region plus the gap(s) between them. As a consequence, in such conventional approaches, the size ($\Lambda$) of the region generally necessary exceeds the value of the wavelength ($\lambda$) of the incident light since, at optical frequencies, the available inclusions are not deeply subwavelength (e.g., with typical sizes in the range $\lambda/6$ to $\lambda/3$ depending on the material forming the inclusions). Accordingly, there is a limit in the value of the maximum bending angle ($\theta_{max}$) achievable using such conventional approaches, and therefore, a limit in the maximum NA of the lens. For example, based on such conventional approaches, the maximum NA reported in simulations performed was about 0.95 (which is similar to the NA that can be obtained with traditional lenses), which corresponds to a maximum bending angle ($\theta_{max}$) of about 72 degrees. However, in actual experiments conducted, the maximum NA reported was only about 0.8, which corresponds to a maximum bending angle ($\theta_{max}$) of only about 53 degrees.

A need therefore exists to provide a diffractive optical element and a method of forming the diffractive optical element that seek to overcome, or at least ameliorate, one or more of the deficiencies of conventional diffractive optical elements, such as, but not limited to, a flat optical lens with improved or higher numerical aperture so as to enhance the resolving capability of the lens.

SUMMARY

According to a first aspect of the present invention, there is provided a diffractive optical element comprising:
a substrate; and
an array of optical nanoantennas arranged on the substrate, the array of optical nanoantennas being spaced apart periodically in a lateral direction for supporting a plurality of diffraction orders at a predetermined wavelength,
wherein each optical nanoantenna in the array of optical nanoantennas is configured to control distribution of electromagnetic energy from an incident light having the predetermined wavelength amongst the plurality of diffraction orders so as to promote scattering of the electromagnetic energy in at least a first direction and suppress scattering of the electromagnetic energy in at least a second direction, the first direction and the second direction corresponding to a first diffraction order and a second diffraction order of the plurality of diffraction orders, respectively.

In various embodiments, each optical nanoantenna in the array is configured to promote scattering of the electromagnetic energy in at least the first direction and a third direction, and suppress scattering of the electromagnetic energy in at least the second direction and a fourth direction, the third direction and the fourth direction corresponding to a third diffraction order and a fourth diffraction order of the plurality of diffraction orders, respectively.

In various embodiments, each optical nanoantenna in the array of optical nanoantennas is configured to have substantially the same geometrical configuration.

In various embodiments, each optical nanoantenna is configured to exhibit constructive interference of the electromagnetic energy in the far-field in at least the first direction so as to enhance scattering efficiency of the electromagnetic energy in at least the first direction and to exhibit destructive interference of the electromagnetic energy in the far-field in at least the second direction so as to minimize scattering efficiency of the electromagnetic energy in at least the second direction.

In various embodiments, each optical nanoantenna in the array is configured to have an asymmetrical shape, the asymmetrical shape being configured to facilitate the array of optical nanoantennas in exhibiting constructive interference of the electromagnetic energy in the far-field in at least the first direction and destructive interference of the electromagnetic energy in the far-field in at least the second direction.

In various embodiments, each optical nanoantenna in the array is configured to comprise a first component having a ring shape and a second component having a cylinder shape, wherein the first and second components are configured to intersect each other.

In various other embodiments, each optical nanoantenna in the array is configured to comprise a first component having a cylinder shape and a second component having a cylinder shape spaced apart from the first component, wherein the first and second components are configured to have a different diameter.

In various embodiments, the first direction has an angle with respect to a zero diffraction order in the range of about 30 to about 89 degrees.

In various embodiments, at least one optical nanoantenna in the array of optical nanoantennas comprises at least one of a semiconductor material and a dielectric material, and said at least one optical nanoantenna supports at least one of electric multipolar resonant modes and magnetic multipolar resonant modes.

In various embodiments, the predetermined wavelength is selected from a visible range or an infrared range, and each optical nanoantenna has a dimension in said lateral direction that is less than the predetermined wavelength.

According to a second aspect of the present invention, there is provided a method of forming a diffractive optical element, the method comprising:
  providing a substrate;
  arranging an array of optical nanoantennas on the substrate, the array of optical nanoantennas being spaced apart periodically in a lateral direction for supporting a plurality of diffraction orders at a predetermined wavelength; and
  configuring each optical nanoantenna in the array of optical nanoantennas to control distribution of electromagnetic energy from an incident light having the predetermined wavelength amongst the plurality of diffraction orders so as to promote scattering of the electromagnetic energy in at least a first direction and suppress scattering of the electromagnetic energy in at least a second direction, the first direction and the second direction corresponding to a first diffraction order and a second diffraction order of the plurality of diffraction orders, respectively.

In various embodiments, each optical nanoantenna in the array is configured to promote scattering of the electromagnetic energy in at least the first direction and a third direction, and suppress scattering of the electromagnetic energy in at least the second direction and a fourth direction, the third direction and the fourth direction corresponding to a third diffraction order and a fourth diffraction order of the plurality of diffraction orders, respectively.

In various embodiments, each optical nanoantenna in the array of optical nanoantennas is configured to have substantially the same geometrical configuration.

In various embodiments, each optical nanoantenna in the array is configured to exhibit constructive interference of the electromagnetic energy in the far-field in at least the first direction so as to enhance scattering efficiency of the electromagnetic energy in at least the first direction and to exhibit destructive interference of the electromagnetic energy in the far-field in at least the second direction so as to minimize scattering efficiency of the electromagnetic energy in at least the second direction.

In various embodiments, each optical nanoantenna in the array is configured to have an asymmetrical shape, the asymmetrical shape configured to facilitate the array of optical nanoantennas in exhibiting constructive interference of the electromagnetic energy in the far-field in at least the first direction and destructive interference of the electromagnetic energy in the far-field in at least the second direction.

In various embodiments, each optical nanoantenna in the array is configured to comprise a first component having a ring shape and a second component having a cylinder shape, wherein the first and second components are configured to intersect each other.

In various other embodiments, each optical nanoantenna in the array is configured to comprise a first component having a cylinder shape and a second component having a cylinder shape spaced apart from the first component, wherein the first and second components are configured to have a different diameter.

In various embodiments, the first direction has an angle with respect to a zero diffraction order in the range of about 30 to about 89 degrees.

In various embodiments, at least one optical nanoantenna in the array of optical nanoantennas comprises at least one of a semiconductor material and a dielectric material, and said at least one optical nanoantenna supports at least one of electric multipolar resonant modes and magnetic multipolar resonant modes.

In various embodiments, the predetermined wavelength is selected from a visible range or an infrared range, and each optical nanoantenna has a dimension in said lateral direction that is less than the predetermined wavelength.

According to a third aspect of the present invention, there is provided a flat optical element comprising:
  a substrate; and
  an array of optical nanoantennas arranged on the substrate to form a plurality of zones, each zone comprising a sub-array of optical nanoantennas spaced apart periodically in a lateral direction for supporting a corresponding plurality of diffraction orders at a predetermined wavelength,
  wherein, for each zone of the plurality of zones, each optical nanoantenna in the sub-array of optical nanoantennas of the respective zone is configured to control distribution of electromagnetic energy from an incident light having the predetermined wavelength amongst the corresponding plurality of diffraction orders so as to promote scattering of the electromagnetic energy in at least a respective first direction and suppress scattering of the electromagnetic energy in at least a respective second direction, the first respective direction and the second respective direction corresponding to a first diffraction order and a second diffraction order of the corresponding plurality of diffraction orders, respectively.

In various embodiments:

each optical nanoantenna in the sub-array of optical nanoantennas of the respective zone is configured to have substantially the same geometrical configuration;

the first diffraction order and the second diffraction order belong to the same order level at opposing sides with respect to a zero diffraction order; and the plurality of zones are a plurality of angular zones, and the sub-array of optical nanoantennas of the respective zone is configured such that an angle which the respective first direction makes with an axis increases as the respective zone is further from the axis for focusing the incident light towards the axis.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a diffractive optical element and a method of forming the diffractive optical that seek to overcome, or at least ameliorate, one or more of the deficiencies of conventional diffractive optical elements. In particular, various embodiments of the present invention provide a diffractive optical element, or more specifically, a diffraction grating, with controlled distribution (scattering) of energy (i.e., electromagnetic energy from an incident light illuminated on the diffractive optical element) amongst a plurality of diffraction orders supported by the diffractive optical element at a predetermined or particular wavelength. For example, the diffractive optical element according to various embodiments of the present invention is able to achieve a highly directional scattering pattern (which may also be referred to as the angular distribution of electromagnetic energy), as well as an exceptionally large maximum bending angle ($\theta_{max}$), such as up to 89 degrees, thereby advantageously overcoming various limitations or deficiencies associated with conventional optical elements, such as those as described hereinbefore in the background. The improved diffractive optical element according to various embodiments of the present invention may in turn be applied or implemented to realize various optical devices or elements (components), such as, but not limited to, lenses, polarizers, polarization beam splitters, and so on, resulting in improved optical devices. For example, according to various embodiments of the present invention, the diffractive optical element with highly directional scattering pattern and exceptionally large maximum bending angle is advantageously applied to realize a flat optical lens with significantly improved numerical aperture, such as an ultra-flat (sub-wavelength thick) lens with ultra-high (near-unity) numerical aperture.

Figure 2:
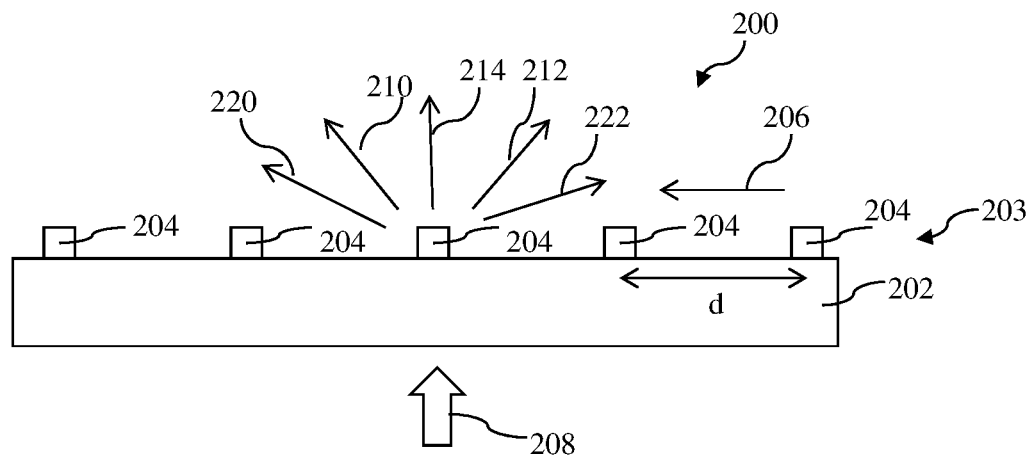
FIG. 2 depicts a schematic drawing of a diffractive optical element according to various embodiments of the present invention.

FIG. 2 depicts a schematic drawing of a diffractive optical element 200 according to various embodiments of the present invention. The diffractive optical element 200 comprises a substrate 202, and an array 203 of optical nanoantennas 204 (which may also be referred to as inclusions) arranged on the substrate 202. The array 203 of optical nanoantennas 204 is spaced apart periodically in a lateral direction 206 for supporting a plurality of diffraction orders at a predetermined wavelength. In particular, each optical nanoantenna (e.g., optical nanoantenna unit-cell) in the array 203 of optical nanoantennas 204 is configured to control distribution of electromagnetic energy from an incident light 208 (illuminated on the array of optical nanoantennas 204) having the predetermined wavelength amongst the plurality of diffraction orders so as to promote scattering of the electromagnetic energy in at least a first direction 210 and suppress scattering of the electromagnetic energy in at least a second direction 212, the first direction 210 and the second direction 212 corresponding to a first diffraction order and a second diffraction order of the plurality of diffraction orders, respectively. It will be appreciated by a person skilled in the art that the first and second directions 210, 212 shown in FIG. 2 are for illustration purpose only and they are not limited to such directions shown, such as, corresponding to diffraction orders at opposing sides of a zero diffraction order 214. In particular, the first and second directions may each be any direction corresponding to a diffraction order amongst the plurality of diffraction orders supported by the array of optical nanoantennas 204 as appropriate or desired, such as corresponding to diffraction orders at the same side of the zero diffraction order 214. For simplicity, the term "optical nanoantenna" may simply be referred to as "nanoantenna" herein.

The array of nanoantennas 204 may be spaced apart periodically by a predetermined distance (d) on the substrate 202 in the lateral direction 206 (e.g., in the direction of the diffractive period). That is, adjacent/neighboring pairs of nanoantennas 204 in the array 203, such as every adjacent/neighboring two nanoantennas 204, in the lateral direction 206 may be spaced apart periodically by the predetermined distance. It will be appreciated by a person skilled in the art that the configuration of the array of nanoantennas 204 shown in FIG. 2 is for illustration purpose only and the present invention is not limited to such a configuration. For example, the array of nanoantennas 204 may be arranged in a one-dimensional array, of which may have a linear configuration or other types of configurations as appropriate, such as circular. Although not illustrated in FIG. 2, the array of nanoantennas 204 may also be arranged in a multi-dimensional array, such as a two-dimensional array having, for example, a square, a hexagonal, or a circular configuration. Furthermore, it will be appreciated by a person skilled in the art that FIG. 2 simply shows the presence of nanoantennas 204 arranged on the substrate and does not represent the actual shape of the nanoantennas 204 according to various embodiments of the present invention. In addition, it will be appreciated by a person skilled in the art that the lateral direction 206 may be a linear direction (e.g., in the case of the nanoantennas being spaced apart in a linear manner) or a curved direction (e.g., in the case of the nanoantennas being spaced apart in a curved or circular configuration).

Accordingly, by configuring each nanoantenna 204 in the array 203 to promote scattering of the electromagnetic energy in at least the first direction 210, while suppressing scattering of the electromagnetic energy in at least the second direction 212, a highly directional scattering pattern can be achieved by the diffractive optical element 200, such as in a direction of a desired diffraction order amongst different diffraction orders supported by the array of nanoantennas 204 for various purposes. As a non-limiting example, as the array of nanoantennas 204 may be configured to produce an exceptionally large maximum bending angle of an incident light 208 (such as up to 89 degrees) in a direction of a desired diffraction order, various embodiments of the present invention advantageously enable an improved flat optical lens with an ultra-high (near-unity) numerical aperture to be realized.

In various embodiments, each optical nanoantenna in the array of nanoantennas 204 may be configured to promote scattering of the electromagnetic energy in at least the first direction 210 and a third direction 220, and suppress scattering of the electromagnetic energy in at least the second direction 212 and a fourth direction 222, the third direction 220 and the fourth direction 222 corresponding to a third diffraction order and a fourth diffraction order of the plurality of diffraction orders, respectively. Similarly, it will be appreciated by a person skilled in the art that the third and fourth directions 220, 222 shown in FIG. 2 are for illustration purpose only and they are not limited to such directions shown, such as, corresponding to diffraction orders at opposing sides of a zero diffraction order 214. In particular, the first to fourth directions may each be any direction corresponding to a diffraction order amongst the plurality of diffraction orders supported by the array of optical nanoantennas 204 as appropriate or desired.

In various embodiments, each nanoantenna 204 in the array 203 is configured to have substantially the same geometrical configuration, such as at least substantially identical or uniform. In various embodiments, the geometrical configuration of a nanoantenna comprises a form (e.g., shape and/or size) and an orientation of the nanoantenna. For example, each nanoantenna 204 in the array 203 is configured on the substrate 202 to have identical geometrical configuration, including its identical form and orientation. In this regard, according to various embodiments, since each nanoantenna (nanoantenna unit-cell) is specifically configured to promote scattering of the electromagnetic energy in at least the first direction 210, while suppressing scattering of the electromagnetic energy in at least the second direction 212, to obtain a highly directional scattering pattern (i.e., to achieve angle-suppressed scattering), each nanoantenna 204 in the array 203 may advantageously be configured to have substantially the same geometrical configuration while still being able to obtain the highly directional scattering pattern.

In various embodiments, the first direction 210 and the second direction 212 may correspond to diffraction orders belonging to the same order level (e.g., the same $m^{th}$ order level), such as the first order level (e.g., $m=\pm 1$), the second order level (e.g., $m=\pm 2$), the third order level (e.g., $m=\pm 3$), and so on, in transmission and/or reflection. For example, the first direction 210 and the second direction 212 may correspond to diffraction orders belonging to the same order level at opposing sides with respect to a zero diffraction order in transmission, namely, the positive first diffraction order (e.g., $m=+1$) and the negative first diffraction order ($m=-1$), respectively.

In various embodiments, to promote scattering of the electromagnetic energy in at least the first direction 210 and suppress scattering of the electromagnetic energy in at least the second direction 212, each optical nanoantenna 204 in the array 203 is configured to exhibit constructive interference of the electromagnetic energy in the far-field in at least the first direction 210 so as to enhance scattering efficiency of the electromagnetic energy in at least the first direction 210 and to exhibit destructive interference of the electromagnetic energy in the far-field in at least the second direction 212 so as to minimize scattering efficiency of the electromagnetic energy in at least the second direction 212.

In various embodiments, to facilitate each optical nanoantenna 204 in the array 203 in exhibiting constructive interference of the electromagnetic energy in the far-field in at least the first direction 210 and destructive interference of the electromagnetic energy in the far-field in at least the second direction 212, each optical nanoantenna of the array of optical nanoantennas 204 is configured to have an asymmetrical shape. In various embodiments, the asymmetrical shape of a nanoantenna may be with respect to a plane (e.g., vertical plane) passing through the nanoantenna (e.g., a center thereof) and at least substantially perpendicular to the lateral direction (e.g., the direction of the diffractive period) in which the nanoantennas are spaced apart in the array 203. In various other embodiments, the asymmetrical shape of a nanoantenna may alternatively or additionally be with respect to a plane (e.g., horizontal plane) passing through the nanoantenna (e.g., a center thereof) and at least substantially parallel to the array 203 (that is, parallel to the surface of the substrate 202 on which the array of nanoantennas is arranged). For example, the first diffraction order and the second diffraction order may belong to the same order level as described hereinbefore. In this regard, the asymmetrical shape of the optical nanoantennas 204 produces electromagnetic energy from the incident light thereto that is asymmetrical (e.g., with respect to a plane (e.g., vertical plane) perpendicular to the direction of the diffraction period). Therefore, the asymmetrical shape of each optical nanoantennas 204 may be configured such that the array of nanoantennas 204 as a whole (that is, taking into account the interactions amongst the nanoantennas 204 in the array 203) produce the above-mentioned constructive and destructive interferences of the electromagnetic energy in the far-field to provide the desired distribution of the electromagnetic energy amongst the different diffraction orders, such as a highly directional scattering pattern in one or more desired directions corresponding to one or more diffraction orders.

According to various embodiments of the present invention, the optical nanoantenna 204 may be configured to have various asymmetrical shapes as long as the asymmetrical shape facilitates the optical nanoantenna 204 to exhibit the desired constructive and destructive interference of the electromagnetic energy in the far-field to produce an overall scattering/radiation pattern having large or sufficient component(s) in one or more desired directions and zero or minimized component(s) in one or more non-desired directions. That is, various embodiments of the present invention is not limited to any specific asymmetrical shapes of the optical nanoantenna, and that various asymmetrical shapes as appropriate that satisfy the above-mentioned conditions are within the scope of the present invention.

In various embodiments, the amount or percentage of the electromagnetic energy transmitted from the array that are concentrated or scattered in the at least a first direction 210 (i.e., the desired one or more directions) is about 60% or more, about 70% or more, about 80% or more, about 90% or more, or about 95% or more, and the amount of the electromagnetic energy that are concentrated or scattered in the at least a second direction 212 is about 40% or less, about 30% or less, about 20% or less, about 10% or less, or about 5% or less.

In various embodiments, however, particular asymmetrical shapes of the optical nanoantenna 204 have been found to be particularly advantageous (e.g., greatly facilitate) in satisfying the above-mentioned conditions.

Figure 3:
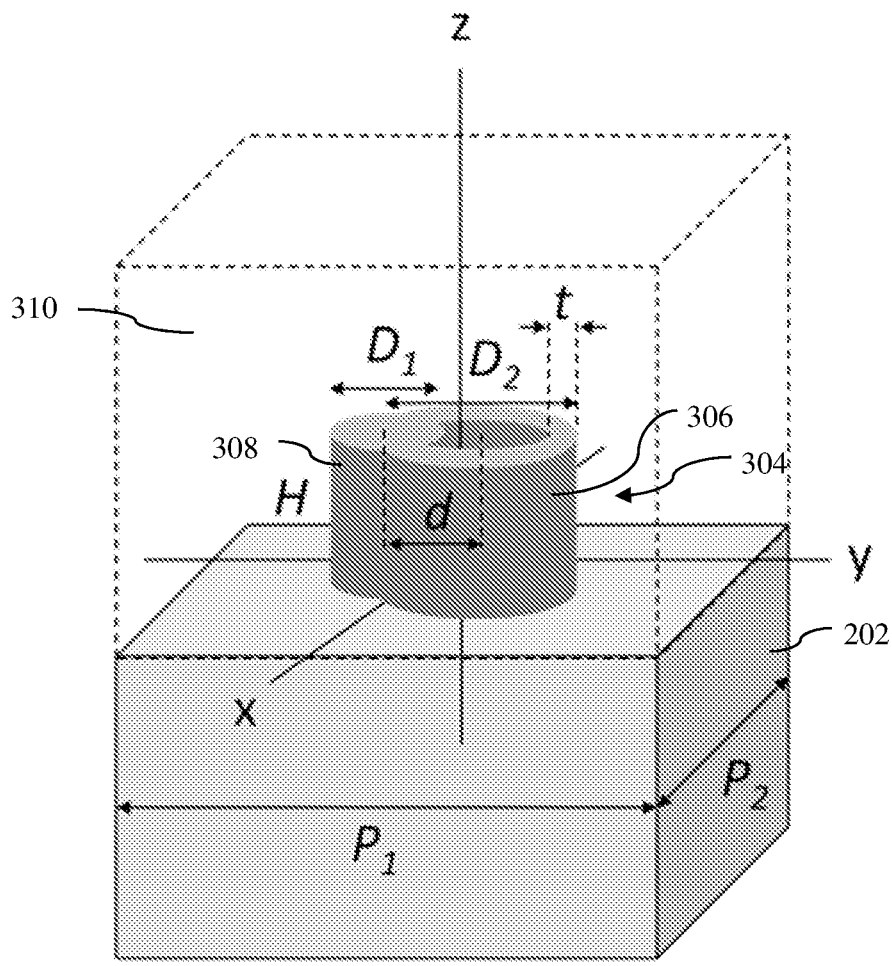
FIG. 3 depicts a perspective schematic view of an optical nanoantenna (unit-cell) formed on a substrate according to a first example embodiment of the present invention.

FIG. 3 depicts a perspective view of an optical nanoantenna 304 formed on a substrate 202 according to a first example embodiment of the present invention. It will be appreciated by a person skilled in the art that FIG. 3 has only illustrated one nanoantenna (unit-cell) of an array of nanoantennas 304 formed on the substrate 202 for the sake of simplicity and clarity. In the first example embodiment, each nanoantenna of the array of nanoantennas is configured to comprise a first component 306 having a ring shape (or in the form of a longitudinally hollow cylinder) and a second component 308 having a cylinder shape (or in the form of a full cylinder). In particular, as shown in FIG. 3, the first component 306 and the second component 308 are configured to intersect each other.

In a preferred example embodiment, the second component 308 is configured to intersect the first component 306 in a lateral direction (e.g., in the direction of the diffractive period or the direction in which the nanoantennas 304 are spaced apart in the array). Further, the diameters of the first and second components 306 and 308 are different so as to enhance asymmetry to facilitate the array of nanoantennas to exhibit the desired constructive and destructive interference of the electromagnetic energy in the far-field to produce a desired overall scattering pattern. For example, as shown in FIG. 3, the first component 306 has a larger diameter ($D_2$) than that of the second component 308 ($D_1$). For a better understanding, exemplary configuration (e.g., dimensions) of the nanoantenna 304 will be described in further details later according to various example embodiments of the present invention.

Figure 4:
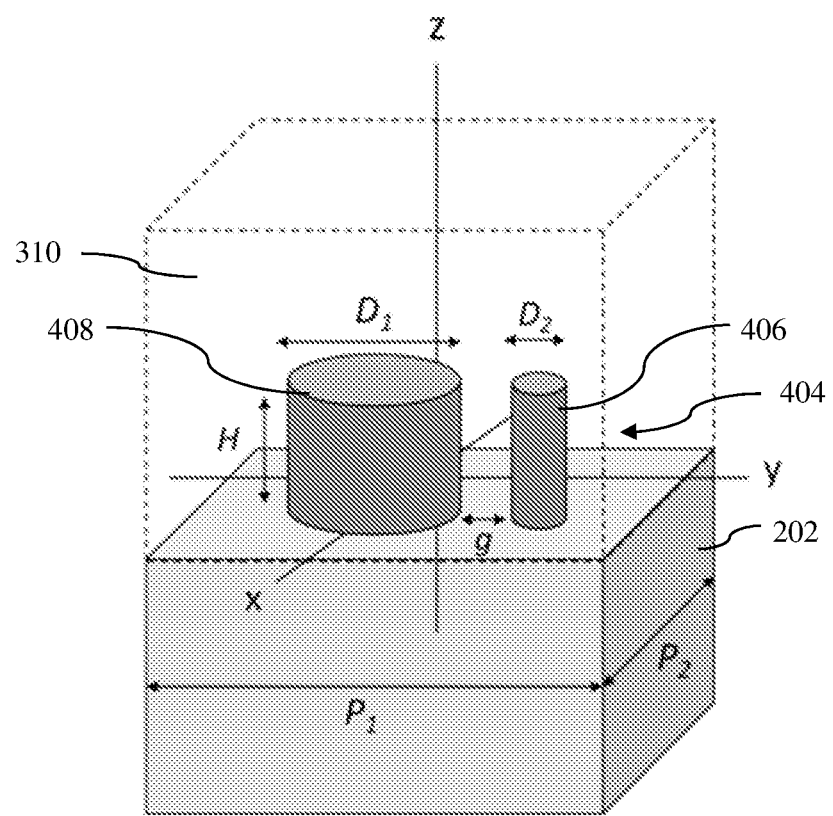
FIG. 4 depicts a perspective schematic view of an optical nanoantenna (unit-cell) formed on a substrate according to a second example embodiment of the present invention.

FIG. 4 depicts a perspective view of an optical nanoantenna 404 formed on a substrate 202 according to a second example embodiment of the present invention. Similarly, it will be appreciated by a person skilled in the art that FIG. 4 has only illustrated one nanoantenna (unit-cell) of an array of nanoantennas 404 formed on the substrate 202 for the sake of simplicity and clarity. In the second example embodiment, each nanoantenna 404 of the array of nanoantennas is configured to comprise a first component 406 having a cylinder shape (or in the form of a full cylinder) and a second component 408 also having a cylinder shape (or in the form of a full cylinder) spaced apart from the first component 406. In particular, the first component 406 and the second component 408 are configured to have a different diameter ($D_2$, $D_1$) so as to enhance asymmetry to facilitate the array of nanoantennas to exhibit the desired constructive and destructive interference of the electromagnetic energy in the far-field to produce a desired overall scattering pattern. For example, as shown in FIG. 4, the first component 406 has a smaller diameter ($D_2$) than that of the second component 408 ($D_1$).

In a preferred example embodiment, the first and second components 406, 408 are spaced apart in a lateral direction (e.g., in the direction of the diffractive period or the direction in which the nanoantennas 402 are spaced apart in the array). For a better understanding, exemplary configuration (e.g., dimensions) of the nanoantenna 404 will be described in further details later according to various example embodiments of the present invention.

In various embodiments, the first direction 210 has an angle with respect to a zero diffraction order 214 (or an axis perpendicular to the surface of the substrate 202 on which the array of nanoantennas 204 is arranged) in the range of about 30 to about 89 degrees. In various further embodiments, the angle may be in the range of about 40 to about 89 degrees, about 50 to about 89 degrees, about 60 to 89 degrees, about 65 to 89 degrees, about 70 to 89 degrees, about 75 to 89 degrees, about 80 to 89 degrees, about 85 to 89 degrees, or about 87 to 89 degrees.

In various embodiments, the nanoantennas 204 may each be made of metallic, semiconductor, and/or dielectric materials. In various example embodiments, the metallic material may be selected from one or more of silver, gold, aluminum or copper. In various example embodiments, the semiconductor material may be selected from one or more of silicon, germanium, gallium phosphide, gallium arsenide, gallium nitride, indium phosphide, boron phosphide or other III-V semiconductors. In various example embodiments, the dielectric material may be selected from one or more of titanium dioxide, zinc oxide, copper oxide, tellurium dioxide, or hafnium dioxide. In various embodiments, the optical nanoantennas 204 may each be made of non-conductive material(s) (i.e., semiconductor and/or dielectric materials) having a refraction index 'n' larger than two.

In various embodiments, at least one nanoantenna in the array 203 of nanoantennas 204 (e.g., all optical nanoantennas in the array 203) comprises at least one of a semiconductor material and a dielectric material. For example, it has been identified according to embodiments of the present invention that the use of semiconductor and/or dielectric materials are advantageous in that such materials have lower dissipative losses and even with simple nanoantenna shapes, such materials are able to support two sets of resonant modes, namely, electric and magnetic, in several multipolar orders. This is greatly beneficial because electromagnetic radiation from the different modes can interfere with each other, allowing the generation of complex, directional and asymmetric, scattering patterns, and therefore, allowing more flexibility to control the energy distribution in the diffractive optical element. Furthermore, in various embodiments, such at least one nanoantenna 204 supports at least one of electric multipolar resonant modes and magnetic multipolar resonant modes.

In various embodiments, the predetermined wavelength is selected from a visible range or an infrared range. Furthermore, each nanoantenna 204 has a dimension in the lateral direction 206 (e.g., in the direction in which the nanoantennas are spaced apart or the direction of the diffractive period) that is less than the predetermined wavelength (i.e., sub-wavelength). For example, each nanoantenna 204 has a largest dimension that is sub-wavelength.

Figure 5:
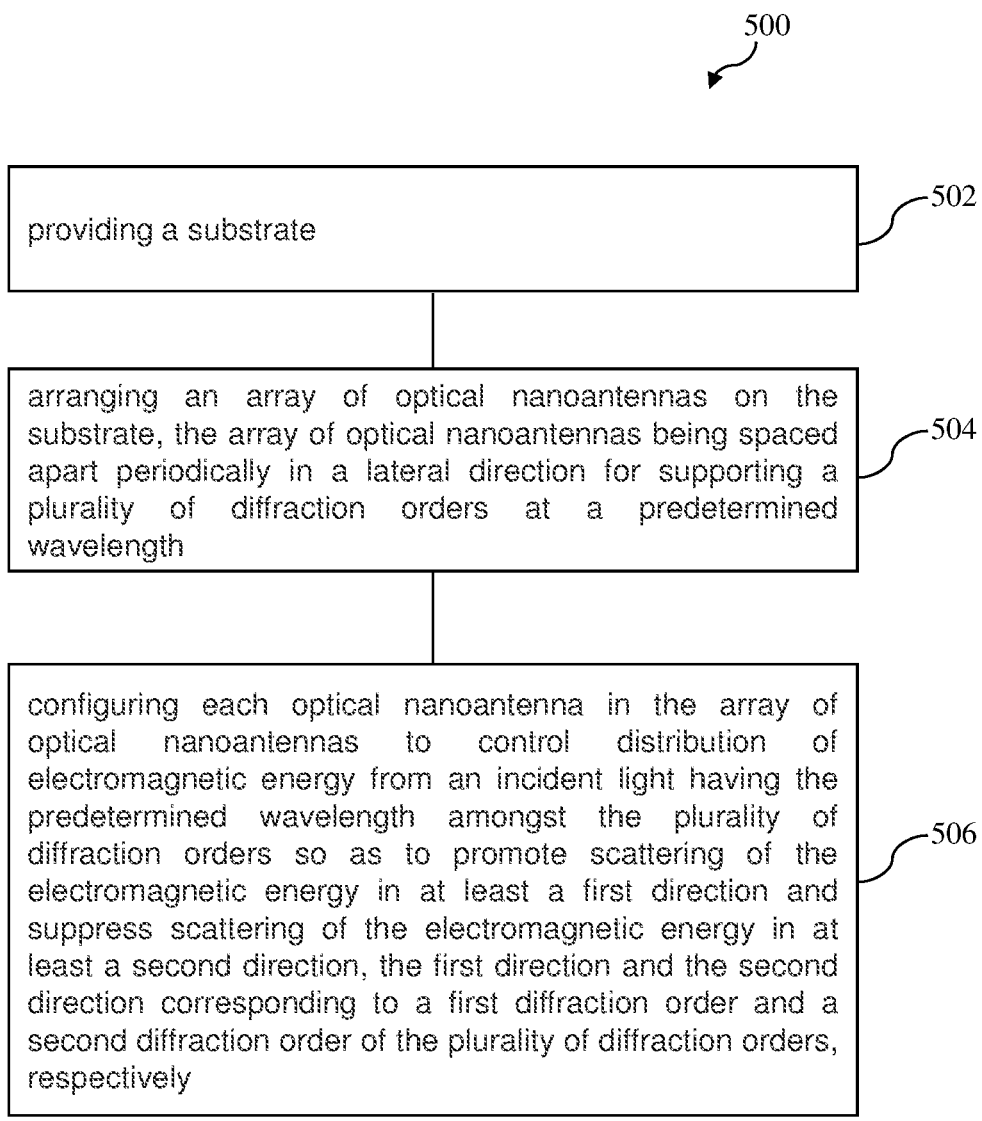
FIG. 5 depicts a schematic flow diagram of a method of forming a diffractive optical element according to various embodiments of the present invention.

FIG. 5 depicts a flow diagram of a method 500 of forming the diffractive optical element 200 according to various embodiments of the present invention. The method 500 comprises a step 502 of providing a substrate 202, a step 504 of arranging an array 203 of optical nanoantennas 204 on the substrate 202, the array 203 of optical nanoantennas 204 being spaced apart periodically in a lateral direction 206 for supporting a plurality of diffraction orders at a predetermined wavelength, and a step 506 of configuring each optical nanoantenna in the array of optical nanoantennas 204 to control distribution of electromagnetic energy from an incident light 208 (on the array of optical nanoantennas 204) having the predetermined wavelength amongst the plurality of diffraction orders so as to promote scattering of the electromagnetic energy in at least a first direction 210 and suppress scattering of the electromagnetic energy in at least a second direction 212, the first direction and the second direction corresponding to a first diffraction order and a second diffraction order of the plurality of diffraction orders, respectively.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter.

Rather, these example embodiments are provided so that this disclosure will be thorough and complete, and will fully convey the scope of the present invention to those skilled in the art.

As described hereinbefore, various embodiments of the present invention provide a diffractive optical element, or more specifically, a diffraction grating, with controlled distribution (scattering) of energy (i.e., electromagnetic energy from an incident light illuminated on the diffractive optical element) amongst a plurality of diffraction orders supported by the diffractive optical element at a predetermined or particular wavelength ($\lambda$). Such a diffractive optical element may then be applied or implemented to realize various optical devices or elements (components), such as, but not limited to, lenses, diffraction gratings, polarizers, polarization beam splitters, and so on, resulting in improved optical devices. For example, the diffractive optical element with highly directional scattering pattern and exceptionally large maximum bending angle can advantageously be applied to realize a flat optical lens with significantly improved numerical aperture, such as an ultra-flat (sub-wavelength thick) lens with ultra-high (near-unity) numerical aperture.

Various example embodiments provide a two-dimensional diffraction grating with controlled energy distribution among the different diffraction modes supported by the grating at a given wavelength, $\lambda$. The grating comprises periodic arrangements (array) of nanoantennas (inclusions) designed/configured to have angle-suppressed scattering patterns when irradiated with an incident light having that given wavelength ($\lambda$). In various example embodiments, the operating principle is based on configuring/designing each nanoantenna in an array such that their scattering ability is inhibited/suppressed at angle(s) coinciding with (corresponding to) the diffraction order(s)/mode(s) for which energy suppression is desired and non-zero/not suppressed at angle(s) coinciding with (corresponding to) the diffraction order(s)/mode(s) for which energy-concentration is desired. In various example embodiments, the nanoantennas are made of a semiconductor material or a dielectric material, or a combination thereof. In various example embodiments, angle-suppressed scattering is produced by configuring each nanoantenna in an array forming the diffraction grating to produce angular interference of the multipolar modes or resonances excited in the nanoantennas when the grating is irradiated by the incident light. In various embodiments, at least one (e.g., all) of the nanoantennas in the array supports at least one of electric multipolar resonant modes and magnetic multipolar resonant modes.

As will be described later in further details, example embodiments of the present invention are advantageously able to produce an ultra-flat optical lens (thickness<$\lambda$/3) with near-unity numerical aperture (NA>0.99).

Figures 6A, 6B:
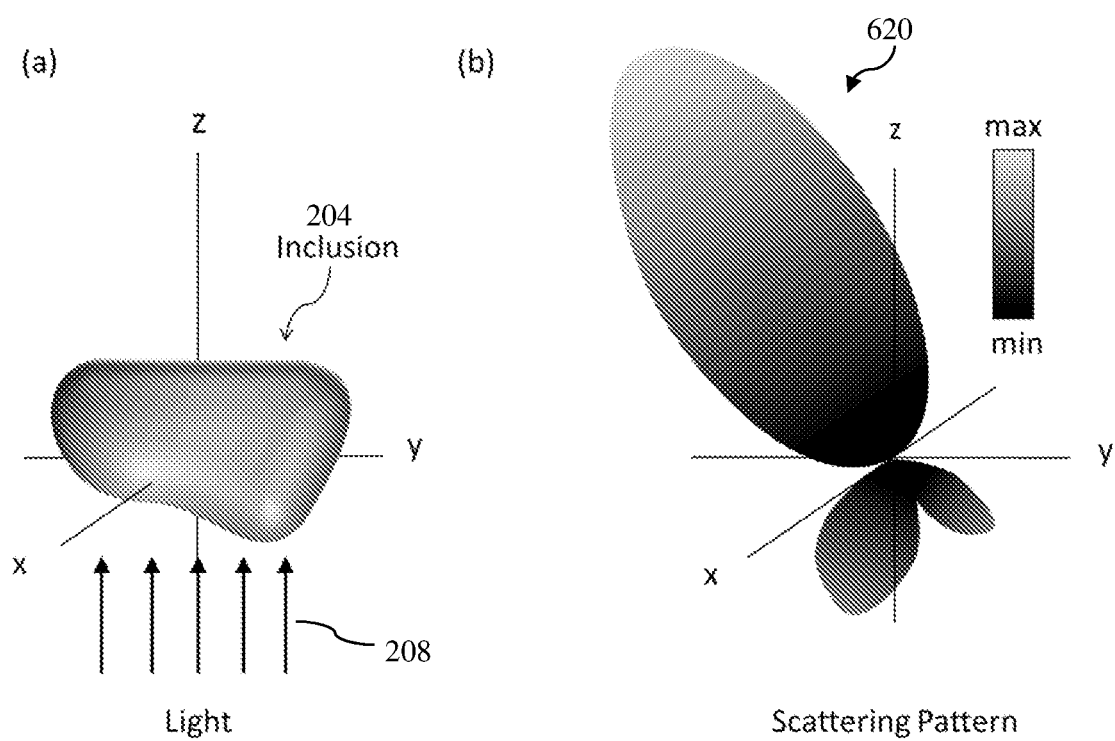
FIG. 6A depicts a schematic drawing of a nanoantenna with an incident light illuminated thereto according to an example embodiment of the present invention.
FIG. 6B depicts a schematic drawing illustrating the scattering (angle-suppressed scattering pattern) of the electromagnetic energy (electromagnetic waves) from the incident light by the nanoantenna shown in FIG. 6A according to an example embodiment of the present invention.

FIG. 6A depicts a schematic drawing of a nanoantenna 204 with the incident light 208 illuminated thereto, and FIG. 6B depicts a schematic drawing illustrating the scattering of the electromagnetic energy (electromagnetic waves) of the incident light 208 by one of the nanoantennas 204 in the array 203 configured according to various example embodiments of the present invention. In particular, the angle-suppressed scattering pattern 620 produced by such a nanoantenna 204 can be observed from FIG. 6B. This illustrates the controlled energy distribution into a desired direction, which may coincide with a diffraction order supported by the grating, and how the array of the nanoantennas 204 may be configured to control energy distribution into any diffraction order and associated diffraction angle.

In various example embodiments, the array 203 of nanoantennas 204 may be arranged in a one-dimensional or two-dimensional lattice and each nanoantenna 204 configured to provide a desired angle-suppressed scattering pattern, such as the scattering pattern as schematically shown in FIG. 6B.

In a grating formed by the periodic arrangements (array) of nanoantennas 204, the diffraction angles are determined by the periods of the array of nanoantennas 204 and the amount of electromagnetic energy going into each diffraction order is related to the scattering efficiency of the nanoantennas in the corresponding angle. In various example embodiments, in order to concentrate the electromagnetic energy into particular desired diffraction order(s), the nanoantennas are configured such that their scattering efficiencies are non-zero at the corresponding angle(s), and are suppressed (e.g., as close as possible to zero) at the corresponding angles that coincide with the diffraction angle(s) for which no energy is desired, thus inhibiting diffraction (scattering) of the electromagnetic energy into such directions. Scattering from each nanoantenna in the array into any angle apart from those of diffraction modes is irrelevant (may be disregarded) because it is compensated (or cancelled) by the scattering from the remaining nanoantennas in the array, leading to zero energy radiated in such directions.

Various example embodiments of the present invention will now be described involving configurations of two-dimensional arrays supporting diffractive orders/modes in the direction of one of the two periods of the lattice only, while being sub-diffractive (or non-diffractive) for the other of the two periods. However, it will be appreciated by a person skilled in the art that the present invention is not limited to supporting diffractive orders in the direction of only one diffractive period of the lattice and can also be applied to control the energy distribution in gratings that are diffractive for both periods of the lattice. Furthermore, it will be appreciated that the configuration of the two-dimensional array is not limited to a square or rectangular array, and can be other types of configuration as desired or appropriate, such as circular or hexagonal.

Figure 7A:
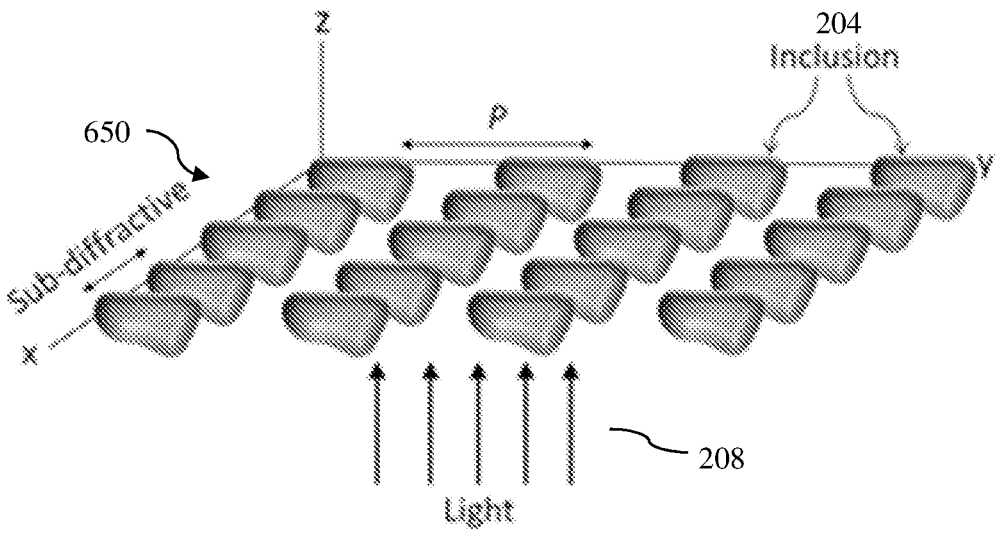
FIG. 7A depicts a schematic drawing of an example array of nanoantennas (forming a diffraction grating) according to various example embodiments of the present invention, with a diffractive period (P) along the y-axis and a non-diffractive period (or sub-diffractive period) along the x-axis.

FIG. 7A depicts a schematic drawing of an array 650 of nanoantennas 204 (forming a diffraction grating) according to various example embodiments of the present invention, with a diffractive period (P) along the y-axis and a non-diffractive period (or sub-diffractive period) along the x-axis. In the example of FIG. 7A, the array 650 of nanoantennas 204 has a square configuration, and may for example be supported by any one of a transparent, opaque or metallic substrate 202 of index $n_i$ on one side and covered by a transparent medium with index $n_t$ on an opposite side, which is diffractive for the periodicity along the y-axis (denoted as "P") and non-diffractive for the periodicity along the x-axis. When the array 650 is illuminated by a normally incident light of wavelength $\lambda$ from the substrate side, the diffraction angles of the $m^{th}$ diffraction order in transmission ($\theta_t^m$) and reflection ($\theta_r^m$) are given, respectively, by the following equations for the case of a transparent substrate:

$$\theta_t^m = \arcsin[m \cdot \lambda/(n_t \cdot P)], \text{ and} \quad \text{(Equation 1)}$$

$$\theta_r^m = \arcsin[m \cdot \lambda/(n_i \cdot P)], \quad \text{(Equation 2)}$$

where m=0, ±1, ±2, ±3, and so on, denotes the diffraction order (or order level), namely, zero diffraction order, first diffraction order, second diffraction order, third diffraction order, and so on.

Figure 7B:
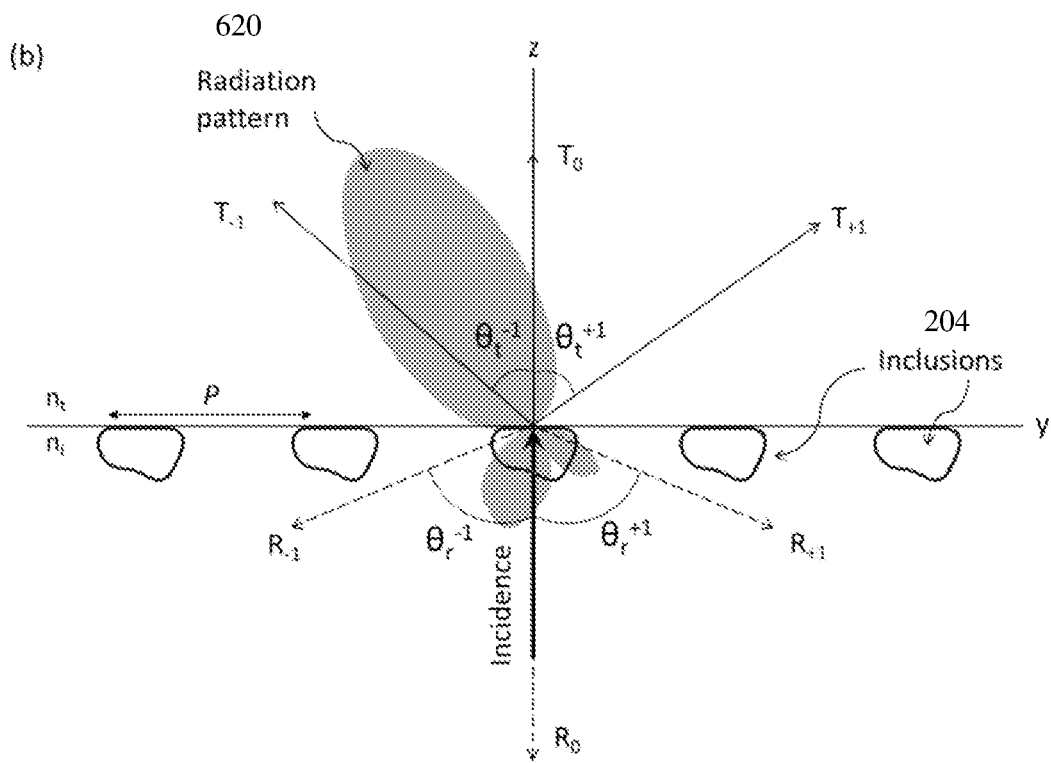
FIG. 7B depicts a schematic side view (y-z plane view) of the example array of nanoantennas of FIG. 7A and illustrates the energy redistribution amongst the different diffraction orders supported by the array, along with the angle-suppressed scattering pattern of one of the nanoantennas in the array.

FIG. 7B depicts a schematic side view (y-z plane view) of the grating 650 and illustrates the energy redistribution amongst the different diffraction orders supported by the grating 650, along with the angle-suppressed scattering pattern 620 of each of the nanoantennas 204 in the grating 650. In FIG. 7B, for simplicity and clarity, the angle-suppressed scattering pattern 620 of only one of the nanoantennas 204 is illustrated. In the example of FIG. 7B, the m=0 and ±1 diffraction orders are indicated. As illustrated in FIG. 7B, the overall scattering pattern from the grating 650 vanishes for two angles (directions), namely, one coinciding with the m=+1 mode in transmission (diffractive mode/order $T_{+1}$) and one coinciding with the m=−1 mode in reflection (diffractive mode $R_{-1}$), while the scattering pattern has non-zero contributions for the remaining diffraction modes. Therefore, for this example grating 650, the diffraction efficiencies (e.g., defined as the amount of the electromagnetic energy going into the corresponding diffraction order) for transmission and reflection are zero for the diffraction orders $T_{+1}$ and $R_{-1}$, and the electromagnetic energy is distributed according to the radiation/scattering efficiency for the remaining diffraction modes, as can be observed in the graphs shown in FIGS. 7C and 7D.

Figure 7C:
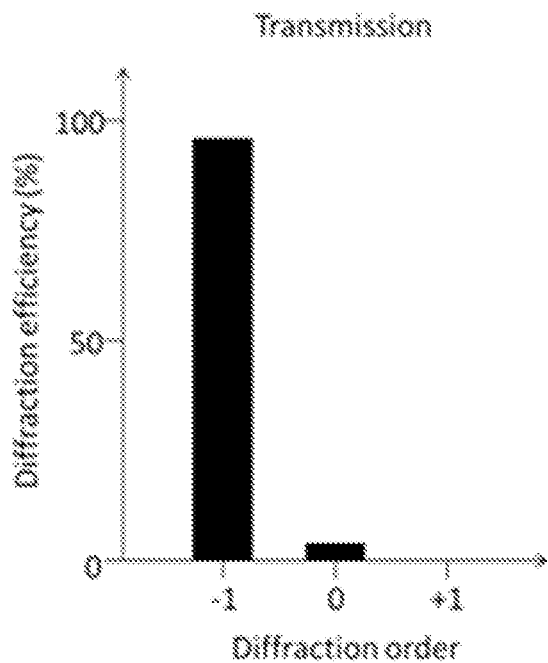
FIGS. 7C and 7D show two graphs of the diffraction efficiencies in transmission and reflection, respectively, for the example array of FIG. 7A with nanoantennas each having the scattering pattern shown in FIG. 7B.
Figure 7D:
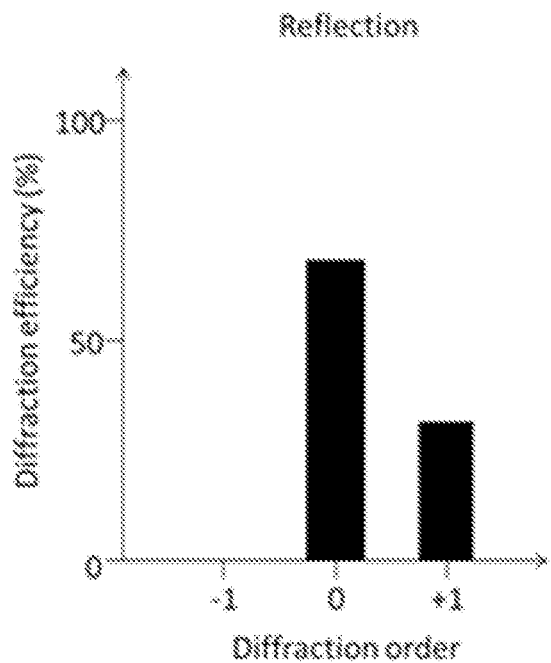

In particular, FIGS. 7C and 7D show two graphs of the diffraction efficiencies in transmission and reflection, respectively, for the example grating 650 with nanoantennas each having the scattering pattern shown in FIG. 7B. For the $T_0$ diffraction order shown in FIG. 7B, two contributions and their mutual influence may be considered, namely, the scattering from the nanoantennas 204 into this direction and the direct transmission of the incident light. For example, the electromagnetic energy into the $T_0$ diffraction order results from summing up the amplitudes of the incident light 208 directly transmitted from the substrate into the covering medium, as if the nanoantennas were not present, and the light scattered from the nanoantennas 204 in the direction corresponding to this direct transmission. It will be appreciated that, when summing up the amplitudes, the phase of the electromagnetic waves, both directly transmitted and scattered by the nanoantennas, should be taken into account. As a consequence, if suppression of electromagnetic energy into the $T_0$ diffraction order is desired, the nanoantennas 204 may be configured in such a way that the scattering from the nanoantennas 204 into the direction of the directly transmitted light has the same amplitude but opposite phase as the directly transmitted light, as to produce a destructive interference between them. Accordingly, FIG. 7B illustrates the operating principle that allows the energy redistribution amongst the different diffraction orders supported by the grating 650, which is enabled by the angle-suppressed scattering pattern 620 of the nanoantennas 204 in the grating 650.

It will be appreciated by a person skilled in the art that the grating 650 may be illuminated by the incident light 208 from the substrate side as shown in FIG. 7A or from an opposite side. For example, in the latter case, the refraction indexes $n_t$ and $n_r$ may then simply be interchanged in Equations 1 and 2 above.

Accordingly, the array of nanoantennas 204 may be configured to distribute the electromagnetic energy of an incoming wave 208 into various different diffraction order(s) supported by the array of nanoantennas 204 as desired, either in transmission or in reflection. In particular, according to various example embodiments, each nanoantenna 204 in the array 203 is configured to exhibit scattering patterns with zeros (or as close as possible to zero) at the angle(s) corresponding to the diffracted order(s) that is desired to be inhibited and to exhibit appropriate or sufficient efficiency at the angle(s) corresponding to diffracted order(s) where energy concentration is desired. In various example embodiments, such a technique may be applied to obtain the bending of the electromagnetic waves at the interface of the array of nanoantennas 204 by any desired angle in the range of 0 to 89 degrees, provided that the size of each nanoantenna in the array is sub-wavelength in the direction of the diffractive period.

In various example embodiments, forming a diffractive optical element includes a first step of arranging an array of nanoantennas on a substrate such that the array of nanoantennas support the diffraction order(s) at the desired angular position(s) at the operating wavelength, and a second step of configuring the nanoantennas (each nanoantenna) in the array to control the distribution of electromagnetic energy into the diffraction order(s) at such desired angular position(s).

For example, in relation to the above-mentioned first step, it is noted that in a given grating (e.g., one- or two-dimensional array of nanoantennas), various parameters/properties, including the lattice symmetry (e.g., square, hexagonal, and so on), the lattice periods, and the index of refraction of the surrounding media (e.g., substrate and covering medium, determine the angular position of the different diffraction orders (in reflection and transmission) supported by the grating under a particular wavelength and angle of incidence. Accordingly, the array of nanoantennas may be arranged on the substrate based on appropriate parameters/properties determined in order to support the diffraction order(s) at the desired angular position(s) at a particular wavelength. In this regard, it will be appreciated by a person skilled in the art that the appropriate parameters/properties for the grating may be determined for achieving the diffraction order(s) at the desired angular position(s), and the present invention is not limited to any specific values of parameters/properties. For a better understanding, exemplary configurations of the grating, including exemplary parameters/properties for achieving certain diffraction order(s) at desired angular position(s) according to various embodiments of the present invention will be described later below by way of examples only for illustration purposes and without limitations.

In relation to the above-mentioned second step, given the desired angular position(s) of the diffraction order(s) supported by the grating (array), the nanoantennas (each nanoantenna) in the array may then be configured based on the following factors/conditions according to example embodiments of the present invention such that the grating is able to control distribution of the electromagnetic energy into the desired diffraction order(s) supported by the grating. In various embodiments, as mentioned hereinbefore, each nanoantenna in the array of nanoantennas may be configured to have substantially the same geometrical configuration. For example, each nanoantenna in the array is configured on the substrate to have identical geometrical configuration, including identical form and orientation.

As a first factor, the overall scattering/radiation pattern of each of the nanoantennas in the array is zero or minimized (e.g., as close to zero as possible) at the angle(s) that correspond to diffraction order(s) into which no energy concentration is desired. The overall scattering/radiation pattern of each nanoantenna in the array refers to the scattering/radiation pattern of the nanoantenna taking into account the interactions with all of the nanoantennas in the array.

As a second factor, the overall scattering/radiation pattern of each of the nanoantennas in the array is non-zero or with sufficient efficiencies at the angle(s) that correspond to diffraction order(s) into which energy concentration is desired.

As a third factor, the energy distribution among the non-zero diffraction orders (i.e., how much energy is desired to be concentrated into each order) is determined by the scattering/radiation intensity from the nanoantennas at those angles. Therefore, according to various example embodiments, each of the nanoantennas in the array is configured to produce scattering/radiation intensity at the desired angle(s) with an amount corresponding to or proportional to the electromagnetic energy that is desired to be concentrated in those desired angle(s). For example, if it is desired to concentrate double energy in a positive first diffraction order as compared to a positive second diffraction order, then each of the nanoantennas in the array is configured such that the scattering/radiation intensity into the positive first diffraction order is double at the angle corresponding to the positive first diffraction order than the angle corresponding to the positive second diffraction order.

As a fourth factor, in the case of the diffraction order corresponding to direct transmission (i.e., zero diffraction order), the contribution of the incident wave should be taken into account. For example, the electromagnetic energy into the $T_0$ diffraction order results from summing up the amplitudes of the incident light directly transmitted from the substrate into the covering medium, as if the nanoantennas were not present, and the overall scattering from the nanoantennas in the direction corresponding to this direct transmission. It will be appreciated that, when summing up the amplitudes, the phase of the electromagnetic waves, both directly transmitted and scattered by the nanoantenna array, should be taken into account. As a consequence, if suppression of electromagnetic energy into the $T_0$ diffraction order is desired, the nanoantenna array may be configured in such a way that the scattering from the nanoantenna array into the direction of the directly transmitted light has the same amplitude but opposite phase as the directly transmitted light, as to produce a destructive interference between them.

By way of examples only for illustration purposes and without limitations, a number of exemplary configurations of the diffractive optical elements for controlling distribution of electromagnetic energy from an incident light to promote scattering of the electromagnetic energy in certain desired direction(s) and suppress scattering of the electromagnetic energy in certain non-desired direction(s) will now be described according to various example embodiments to demonstrate how the diffractive optical elements may be formed to achieve angle-suppressed scattering at certain desired angle(s).

In the exemplary configurations to be described below, the nanoantennas in the array are made of dielectric and semiconductor materials. In this regard, as explained hereinbefore, although the nanoantennas may be realized using metallic material, the use of semiconductor and/or dielectric materials may be advantageous in that such materials have lower dissipative losses and, even with simple nanoantenna shapes, such materials can support two sets of resonant modes, namely, electric and magnetic resonances, in several multipolar orders. This is greatly beneficial because electromagnetic radiation from the different modes can interfere with each other, allowing the generation of complex, directional and angle-suppressed scattering patterns and, therefore, allowing more flexibility to control the energy distribution in the diffractive optical element.

The exemplary configurations were characterized by electromagnetic simulations using the Finite Difference Time Domain (FDTD) method, and one of the exemplary configurations was also verified experimentally.

A first exemplary configuration of the diffractive optical element according to a first example embodiment will now be described. In the first exemplary configuration, each nanoantenna 304 of the array of nanoantennas is configured to comprise a first component 306 having a ring shape (or in the form of a longitudinally hollow cylinder) and a second component 308 having a cylinder shape (or in the form of a full cylinder), whereby the first component 306 and the second component 308 are configured to intersect each other, as shown in the unit-cell of the nanoantenna 304 depicted in FIG. 3 described hereinbefore. For example, the nanoantenna 304 is formed by a single particle generated by the intersection of a cylinder 308 and a non-concentric ring 306. As will be shown later below, the grating formed by such nanoantennas 304 according to the first exemplary configuration is able to bend transmitting light having a wavelength of 799.56 nm at an exceptionally large angle of about 88 degrees, corresponding to the $T_{-1}$ diffraction order, and with an overall transmission into this desired $T_{-1}$ diffraction order exceeding 49% (which translates into about 92% efficiency, i.e., of the transmitted power being concentrated into this desired $T_{-1}$ diffraction order).

In the first exemplary configuration, the nanoantenna 304 is made of silicon, and is supported by a transparent $SiO_2$ substrate 202 on one side and surrounded by air 310 on an opposite side. The nanoantenna 304 may be made of any other material(s) with refraction index n>2, such as one or more of $TiO_2$, ZnO, GaN, GaAs, InP, Ge, other group IV and III-V semiconductors, and so on. The substrate 202 may be made of any other transparent material, such as glass, quartz, SiN, and so on. The surrounding air 310 covering the nanoantenna 304 may instead be any transparent material(s), such as one or more of glass, quartz, SiN, and so on. It can be understood that different specific materials may require different geometrical parameters of the nanoantenna to be adjusted/modified for the nanoantenna to operate at the desired wavelength of incidence.

The nanoantenna 304 is formed by the intersection of cylinder 308 and a non-concentric ring 306. In the first exemplary configuration, the exemplary dimensions of the nanoantenna 304 indicated in FIG. 3 are as follow: the height (H) of cylinder 308 and the non-concentric ring 306 is 240 nm, the diameter ($D_1$) of the cylinder 308 is 220 nm, the diameter ($D_2$) of the ring 306 is 350 nm, the thickness or width (t) of the ring 306 is 75 nm, and the distance (d) between the centers of the cylinder 308 and the non-concentric ring 306 is 155 nm. The diffractive period ($P_1$) of the grating is 800 nm and the non-diffractive period ($P_2$) is 400 nm.

Figure 8:
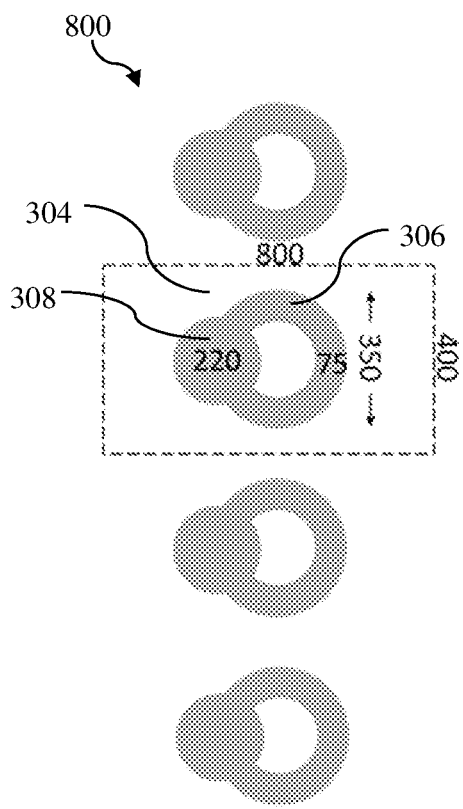
FIG. 8 depicts a schematic top view of a diffractive optical element including nanoantennas based on the first exemplary configuration shown in FIG. 3 according to various example embodiments of the present invention.
Figure 9A:
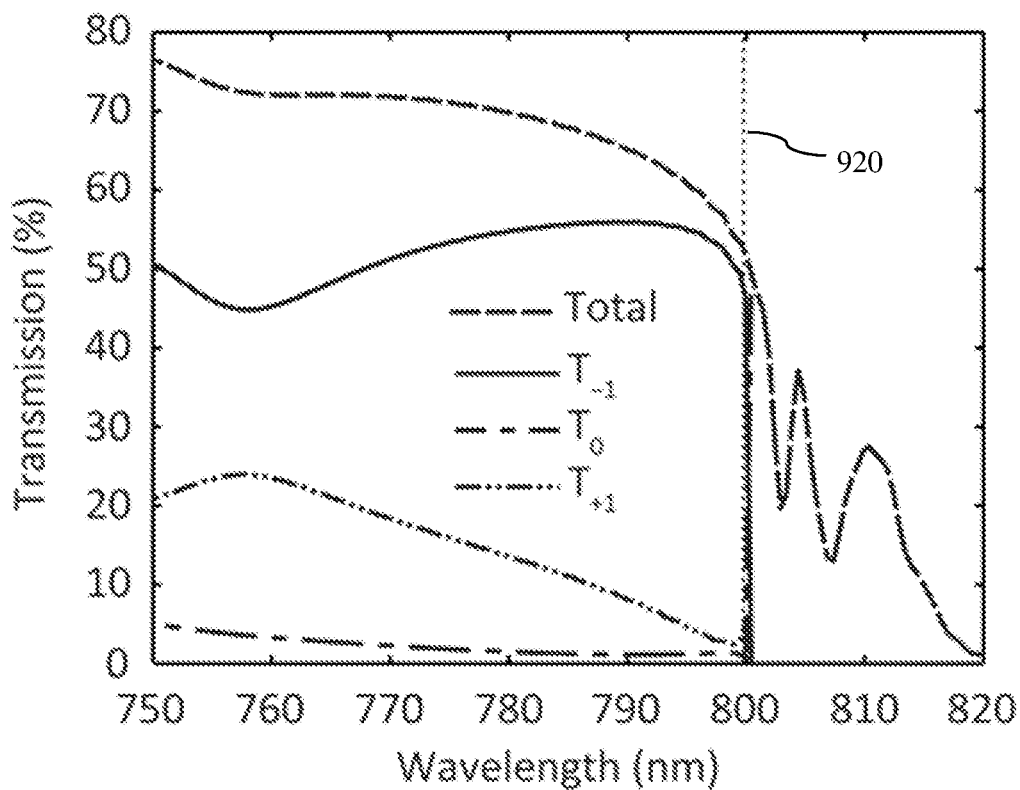
FIG. 9A depicts a graph showing the simulated energy redistribution in transmission into $T_{-1}$, $T_0$ and $T_{+1}$ diffraction orders as a function of wavelength for the diffractive optical element shown in FIG. 8.
Figure 9B:
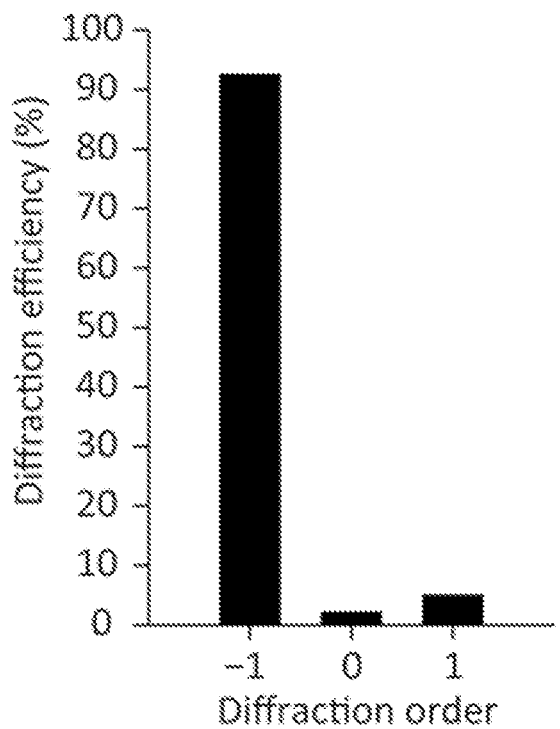
FIG. 9B depicts a graph showing the diffraction efficiencies at the operating wavelength of 799.56 nm in the transmission for $T_{-1}$, $T_0$ and $T_{+1}$ diffraction orders for the diffractive optical element shown in FIG. 8.

FIG. 8 depicts a schematic top view of the diffractive optical element 800 according to the first exemplary configuration, whereby the unit for the dimensions shown is in nanometers. To characterize the capacity of the diffractive optical element 800 to concentrate the electromagnetic energy into the desired $T_{-1}$ diffraction order according to the first example embodiment, simulations of the transmitted power into different diffraction orders as a function of wavelength were performed. Results from electromagnetic simulations of the diffractive optical element are shown in FIG. 9A. The design wavelength of the incident light of 799.56 nm is indicated by a vertical dotted line 920. At this wavelength, the diffraction angle associated to the first diffraction orders corresponds to 88 degrees. Furthermore, at this wavelength, the diffractive optical element 800 concentrates 49.48% of the incident energy into the $T_{-1}$ diffraction order, with values as low as 1.18% and 2.72% into the $T_0$ and $T_{+1}$ diffraction orders, respectively. This translates into a large diffraction efficiency in transmission for the $T_{-1}$ diffraction order, namely, 92.69%, with only a residual 2.21% for the $T_0$ diffraction order and 5.1% for the $T_{+1}$ diffraction order, as shown in FIG. 9B. In particular, FIG. 9B shows a graph of the diffraction efficiencies in the transmission for $T_{-1}$, $T_0$ and $T_{+1}$ diffraction orders for the diffractive optical element 800 according to the first exemplary configuration.

In the diffractive optical element according to the first exemplary configuration, each nanoantenna 304 supports different multipolar modes. Due to the asymmetry of the nanoantenna 304, and induced by the retardation of the wave, some of these multipoles are asymmetric with respect to the incident direction (e.g. generating a tilting of induced dipoles). The scattered electromagnetic fields from each of those modes may constructively or destructively interfere in the far-field leading to the appearance of lobes or nodes (suppression) in the total radiation at certain angles. As a consequence of the asymmetry of the multipoles, the associated scattering pattern may also be asymmetric. The nanoantennas 304 are configured/designed to make the angles at which the scattering is suppressed coincide with those angles corresponding to the $T_0$ diffraction order (which includes also contribution from the directly transmitted incident wave) and the $T_{+1}$ order (thus inhibiting the diffraction into these diffraction orders), but having a non-zero contribution in the $T_{-1}$ diffraction order (the diffraction order at which concentration of energy (or bending of energy) is desired). The calculated radiation pattern (power versus angle) at the working wavelength of 799.56 nm from one of the unit-cells of the grating is shown in FIG. 10A, together with the directions of the different diffraction orders (indicated by the long dashed lines).

Figure 10A:
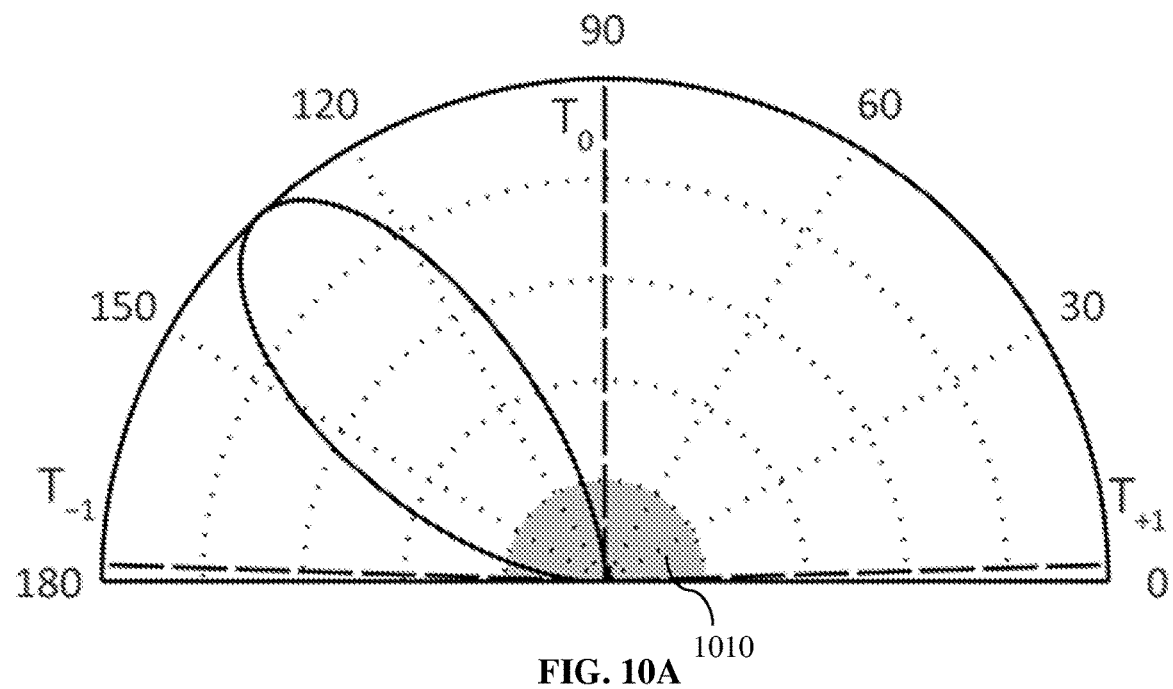
FIG. 10A illustrates the simulated, transmitted radiated power as a function of angle at the working wavelength of 799.56 nm from one nanoantenna (unit-cell) shown in FIG. 3 of the array/grating shown in FIG. 8.
Figure 10B:
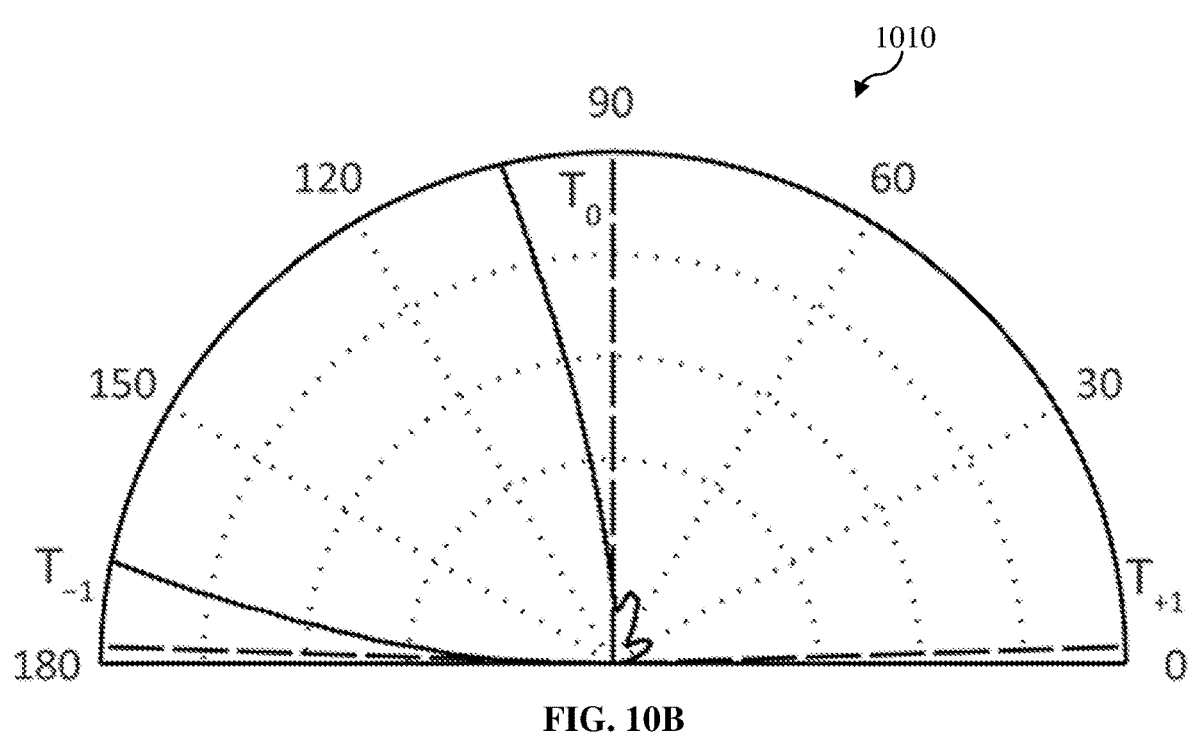
FIG. 10B shows an enlarged view of the shaded area of FIG. 10A.

A better illustration of the amount of power radiated at each diffraction angle is obtained by enlarging the shaded area 1010 shown in FIG. 10A, and the enlarged area 1010 is shown in FIG. 10B. It can be observed that while the $T_0$ and $T_{+1}$ diffraction orders are almost entirely inhibited, the $T_{-1}$ diffraction order has a significantly larger contribution. As mentioned hereinbefore, it should be noted that at any other angle apart from those corresponding to the diffraction orders, radiation/scattering from the complete array of nanoantennas is always zero due to the destructive interferences of radiation from the different nanoantennas in the grating.

A second exemplary configuration of the diffractive optical element according to a second example embodiment will now be described. In the second exemplary configuration, each nanoantenna 404 of the array of nanoantennas is configured to comprise a first component 406 having a cylinder shape (or in the form of a full cylinder shape) and a second component 408 also having a cylinder shape (or in the form of a full cylinder) spaced apart from the first component 406, as shown in the unit-cell of the nanoantenna 404 depicted in FIG. 4. For example, the nanoantenna 404 is formed by a pair of electromagnetically coupled cylinders. As will be shown later below, the grating formed by the array of nanoantennas bends transmitting light having a wavelength of 713.9 nm at an angle of about 82 degrees, corresponding to the $T_{-1}$ diffraction order, and with an overall transmission into the desired $T_{-1}$ diffraction order exceeding 42% (which translates into about 83% efficiency, i.e., of the transmitted power being concentrated into this desired $T_{-1}$ diffraction order).

In various example embodiments, the nanoantenna 404 may further include one or more additional components, each also having a cylinder shape, spaced apart from the second component (in the same or similar manner as the second component 408 is spaced apart from the first component 406) for various purposes, such as to facilitate in obtaining certain desired bending angles as will be shown later below in Tables 3 and 4.

In the second exemplary configuration, the nanoantenna 404 is made of silicon (i.e., pair of electromagnetically coupled silicon nano-cylinders), and is supported on one side by a transparent $SiO_2$ substrate 202 and covered on an opposite side by surrounding air 310. Similar to the first exemplary configuration, the nanoantenna 404 may be made of any other material with refraction index n>2, such as $TiO_2$, ZnO, GaN, GaAs, InP, Ge, other group IV and III-V semiconductors, and so on. The substrate 202 may be made of any other transparent material, such as glass, quartz, SiN, and so on. The surrounding air 310 covering the nanoantenna 404 may instead be any transparent material, such as glass, quartz, SiN, and so on. It can be understood that different specific materials may require different geometrical parameters of the nanoantenna to be adjusted/configured for the nanoantenna to operate at the desired wavelength of incidence.

In the second exemplary configuration, each nanoantenna 404 of the array is configured with the following exemplary dimensions such that the array of such nanoantennas 404 is operable to concentrate the transmitted energy into the $T_{-1}$ diffraction order at 713.9 nm wavelength when illuminated from the substrate side: the height (H) of the pair of electromagnetically coupled cylinders is 250 nm, the inter-cylinder gap (g) is 50 nm, and the diameters ($D_1$, $D_2$) of the large and small cylinders 408, 406 are 190 nm and 150 nm, respectively. The diffractive period ($P_1$) is 721 nm and the non-diffractive period ($P_2$) is 260 nm.

Figure 11:
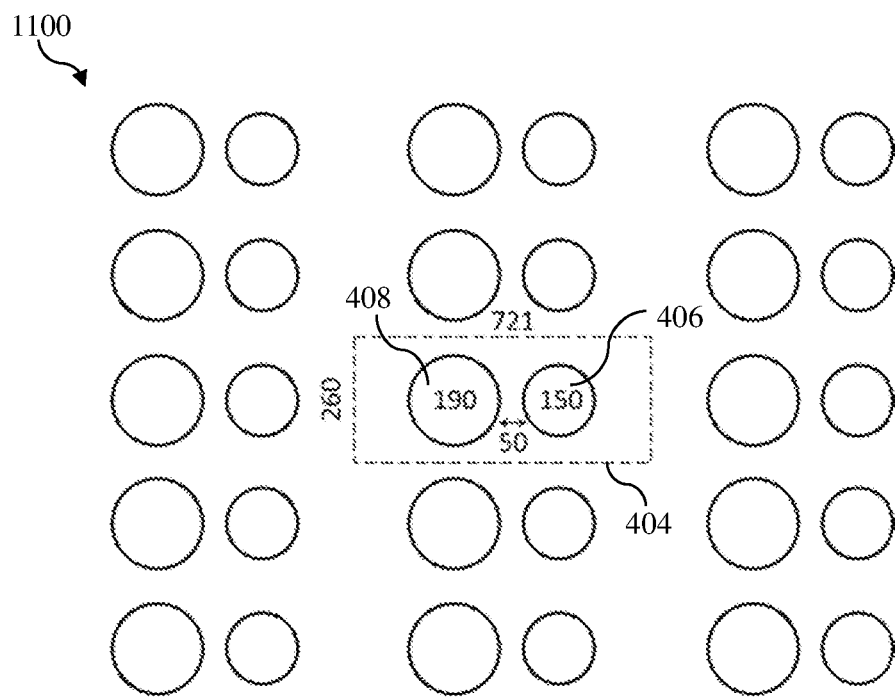
FIG. 11 depicts a schematic top view of a diffractive optical element including nanoantennas based on the second exemplary configuration shown in FIG. 4 according to various example embodiments of the present invention.
Figure 12A:
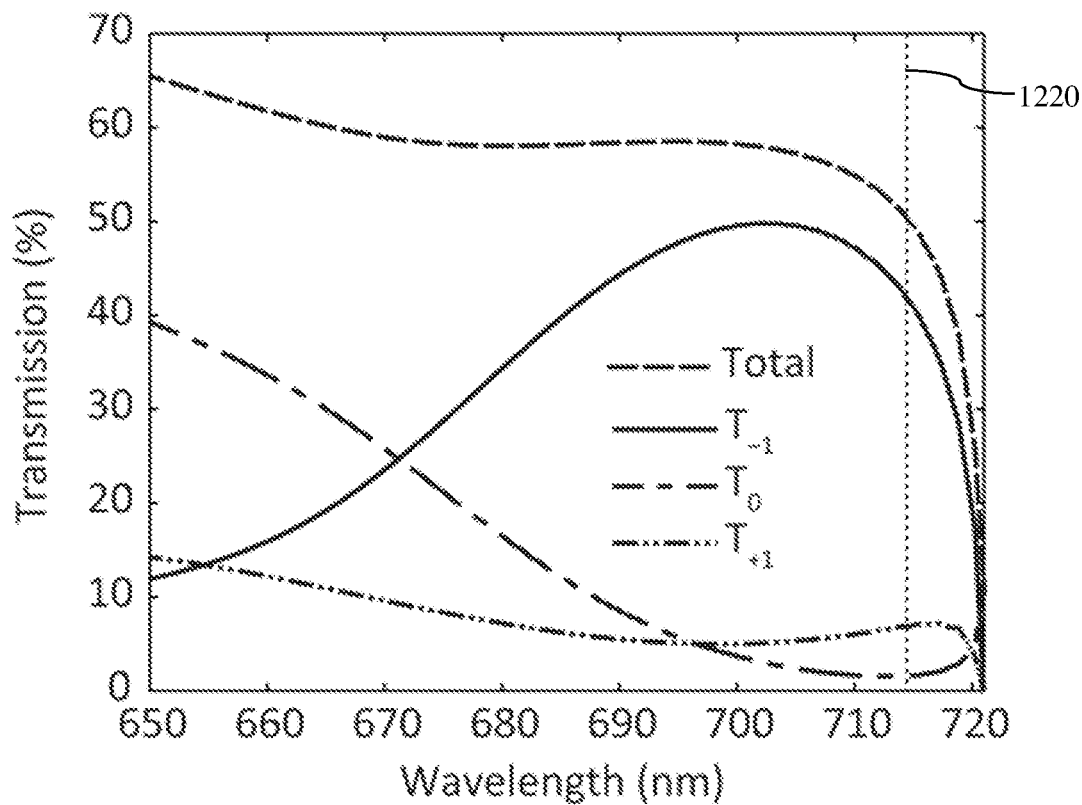
FIG. 12A depicts a graph showing the simulated energy redistribution in transmission into $T_{-1}$, $T_0$ and $T_{+1}$ diffraction orders as a function of wavelength for the diffractive optical element shown in FIG. 11.
Figure 12B:
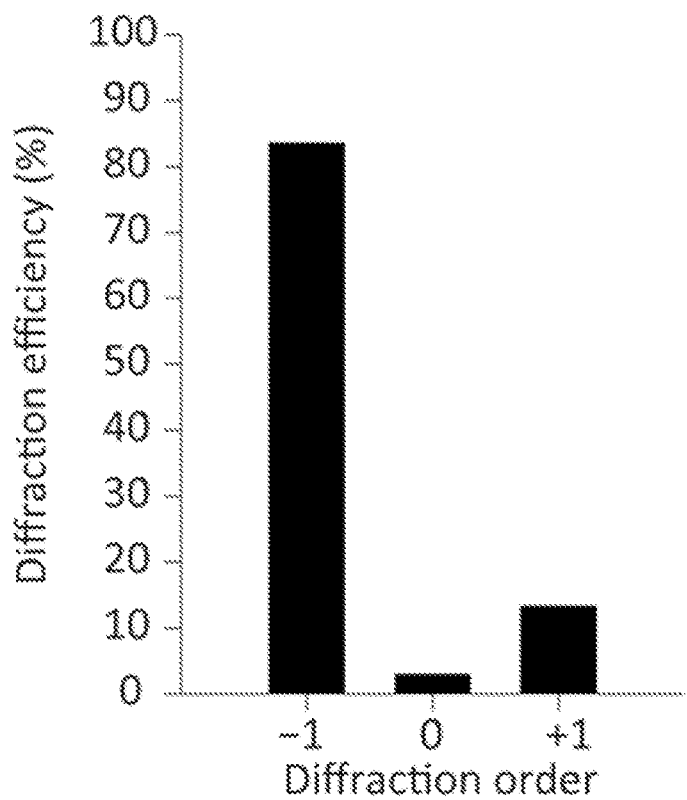
FIG. 12B depicts a graph showing the diffraction efficiencies at the operating wavelength of 713.9 nm in the transmission for $T_{-1}$, $T_0$ and $T_{+1}$ diffraction orders for the diffractive optical element shown in FIG. 11.

FIG. 11 depicts a schematic top view of the diffractive optical element 1100 according to the second exemplary configuration, whereby the unit for the dimensions shown is in nanometers. Similar to the first example embodiment described above, to characterize the capacity of the diffractive optical element 1100 to concentrate the electromagnetic energy into the desired $T_{-1}$ diffraction order according to the second example embodiment, simulations of the transmitted power into the different diffraction orders as a function of wavelength were performed. Results from the electromagnetic simulations of the diffractive optical element 1100 are shown in FIG. 12A. The design wavelength of the incident light of 713.9 nm is indicated by a vertical dotted line 1220. At this wavelength, the diffraction angle associated to the first diffraction orders corresponds to 82 degrees. Furthermore, at this wavelength, the diffractive optical element concentrates 42.86% of the incident energy into the $T_{-1}$ diffraction, with only 1.55% and 6.84% into the $T_0$ and $T_{+1}$ diffraction orders, respectively. This translates into a large diffraction efficiency in transmission for the $T_{-1}$ diffraction order of 83.64%, with minimized diffraction efficiencies of 3.02% for the $T_0$ diffraction order and of 13.34% for the $T_{+1}$ diffraction order, as shown in FIG. 12B. In particular, FIG. 12B shows a graph of the diffraction efficiencies in the transmission for $T_{-1}$, $T_0$ and $T_{+1}$ diffraction orders for the diffractive optical element according to the second exemplary configuration.

Figure 13A:
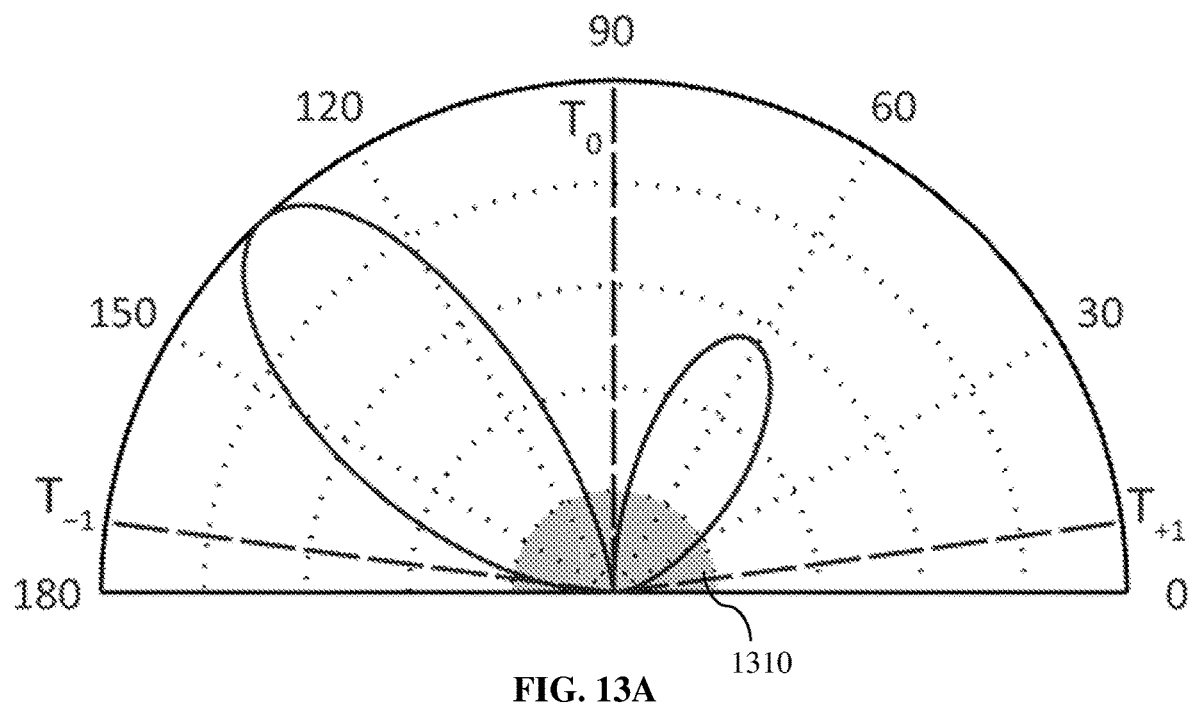
FIG. 13A illustrates the simulated, transmitted radiated power as a function of angle at the working wavelength of 713.9 nm from one nanoantenna (unit-cell) shown in FIG. 4 of the array/grating shown in FIG. 11.
Figure 13B:
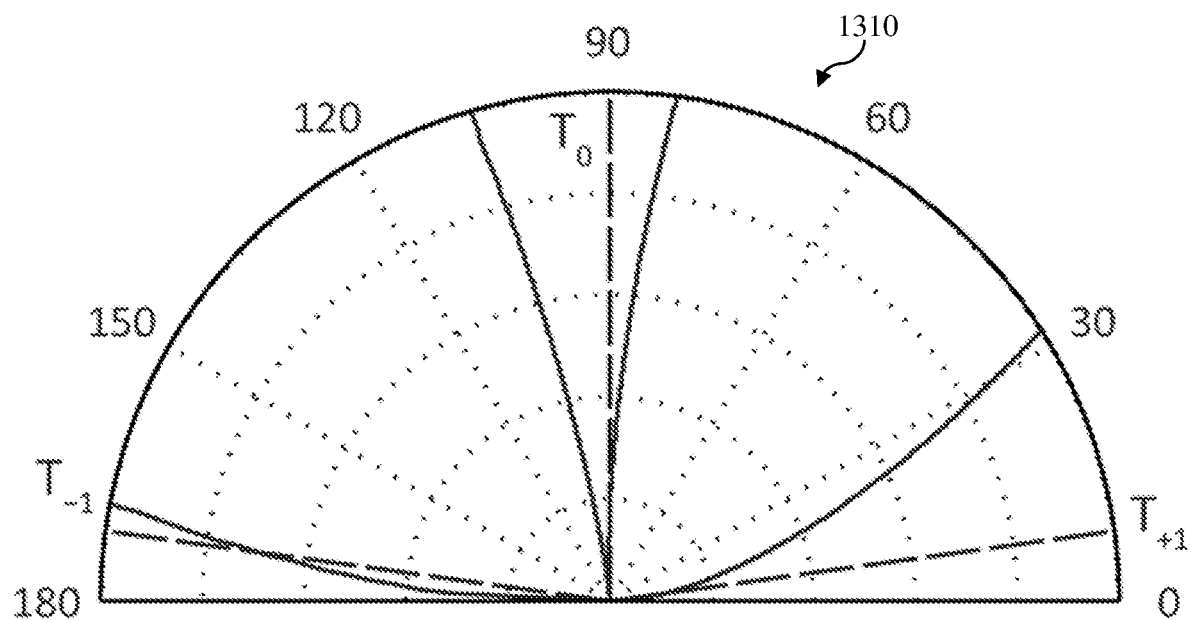
FIG. 13B shows an enlarged view of the shaded area of FIG. 13A.

The diffractive optical element according to the second exemplary configuration operates similarly to the first exemplary except that in the second exemplary configuration, each nanoantenna (unit-cell) having a pair of electromagnetically coupled cylinders supports different multipolar modes that interact. The scattered electromagnetic fields from each of the different multipolar modes interfere in the far-field leading to the suppression of the total radiation at certain angles, which are configured to coincide with the particular angles corresponding to the $T_0$ diffraction order and the $T_{+1}$ diffraction order, but having a non-zero contribution in the $T_{-1}$ diffraction order. The calculated scattering/radiation pattern (power versus angle) at the working wavelength of 713.9 nm from one of the unit-cells of the grating in the second example embodiment is shown in FIG. 13A, together with the directions of the different diffracted orders (indicated by the long dashed lines). Again, for a better illustration of the amount of power radiated at each diffraction angle, the shaded area 1310 in FIG. 13A is enlarged and the enlarged area 1310 is shown in FIG. 13B. It can be observed that the results of the second example embodiment corroborate well with the results of the first example embodiment in that while the $T_0$ and $T_{+1}$ diffraction orders are significantly inhibited, the $T_{-1}$ diffraction order has a significantly larger contribution, leading to a concentration of the electromagnetic energy into the $T_{-1}$ diffraction order.

A third exemplary configuration of the diffractive optical element according to a third example embodiment will now be described to demonstrate that the operating principle holds for different spectral ranges by, for example, setting appropriate dimensions and selecting suitable material(s). In the third exemplary configuration, each nanoantenna of the array is formed by a pair of electromagnetically coupled nano-cylinders as described hereinbefore in the second example embodiment, except that they are made of titanium dioxide ($TiO_2$) instead of silicon. In this third example embodiment, experimental verification of the operation of the diffractive optical element will also be presented. As will be shown later below, the grating formed by such nanoantennas according to the third exemplary configuration is able to bend transmitting light having a wavelength of 560 nm at an angle of about 51 degrees, corresponding to the $T_{-1}$ diffraction order, and experimentally, with an overall transmission into the desired $T_{-1}$ diffraction order exceeding 62% (which translates into about 72% efficiency, i.e., of the transmitted power being concentrated into this desired $T_{-1}$ diffraction order).

Figure 14A:
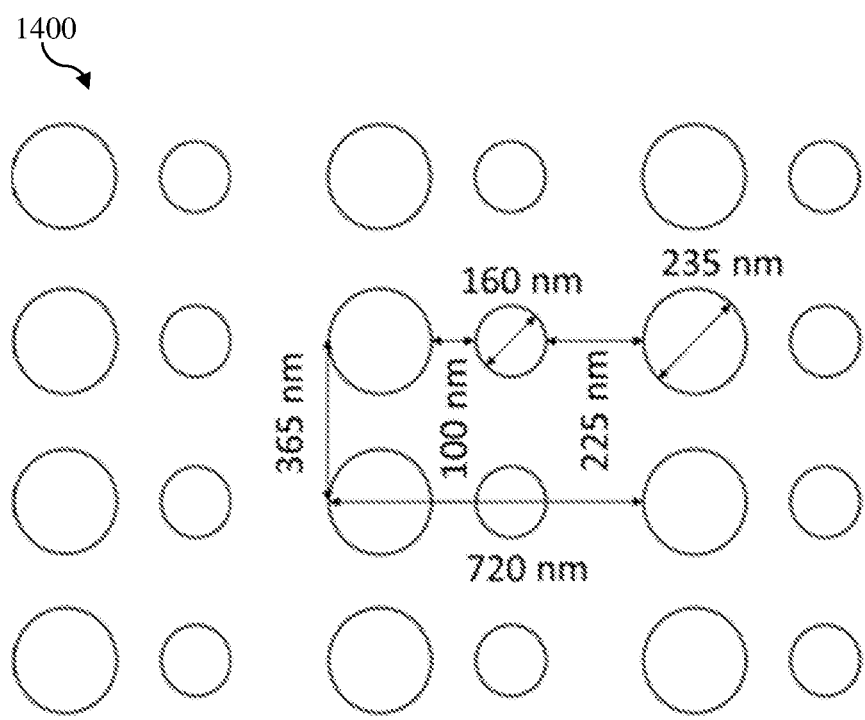
FIG. 14A depicts a schematic top view of a diffractive optical element including nanoantennas based on a third exemplary configuration according to various example embodiments of the present invention.

FIG. 14A depicts a schematic top view of the diffractive optical element 1400 according to the third exemplary configuration. In the third exemplary configuration, similar to the second exemplary configuration, the nanoantenna comprises a pair of electromagnetically coupled nano-cylinders, and is supported by a transparent $SiO_2$ substrate on one side and surrounded by air 310 on an opposite side. However, as mentioned above, instead of the nanoantenna being made of silicon, the nanoantenna is made of titanium dioxide in the third exemplary configuration. For example, a reason may be that such a material has lower dissipative losses in the visible range. Due to the smaller operating wavelength and the lower refractive index of $TiO_2$ ($n \approx 2.4$), the configuration (dimensions) of the array of nanoantennas are set or adjusted (e.g., scaled) accordingly (e.g., with respect to the dimensions of the array of nanoantennas of the second exemplary configuration).

Figure 14B:
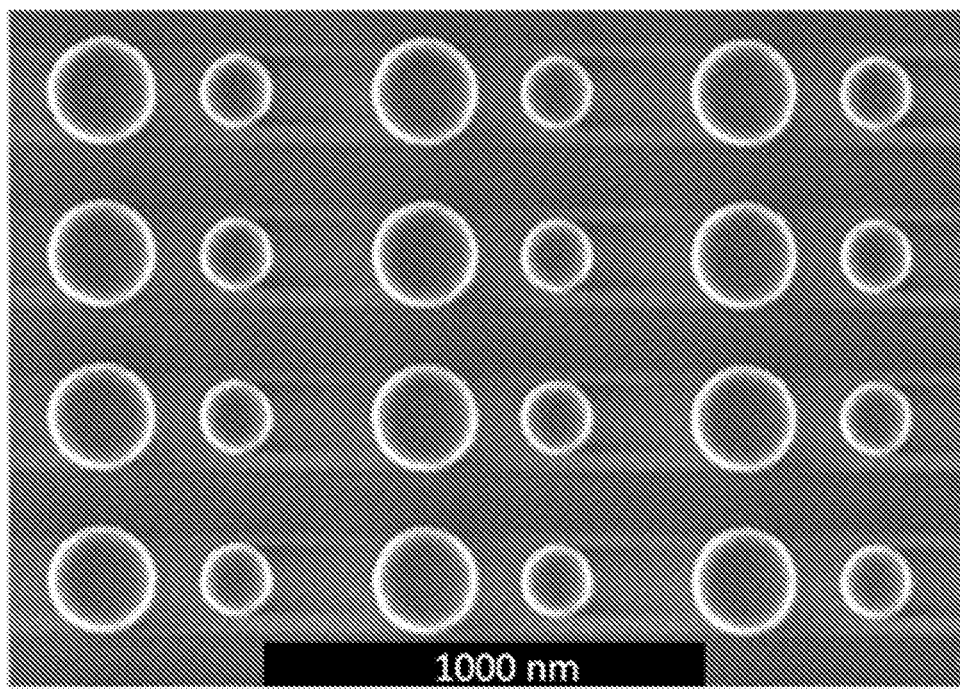
FIGS. 14B and 14C depict scanning electron microscope (SEM) images of the actual fabricated sample of the diffractive optical element according to the third exemplary configuration, with different magnification levels, respectively.
Figure 14C:
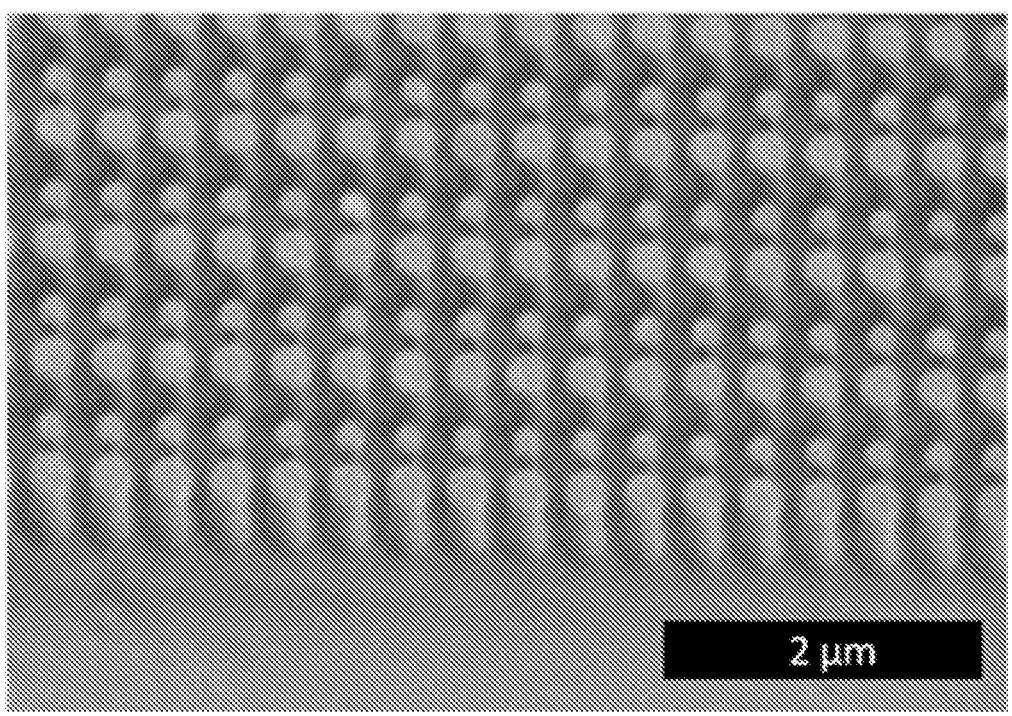

Accordingly, in the third exemplary configuration, the electromagnetically coupled cylinders have a designed height (H) of 305 nm, the diameters ($D_1$, $D_2$) of the larger and smaller disks are 235 nm and 160 nm, respectively. The inter-particle gap (g) is 100 nm. The diffractive period ($P_1$) is set to 720 nm and the non-diffractive period ($P_2$) is set to 365 nm. For illustration purpose only, scanning electron microscope (SEM) images of the actual fabricated sample of the diffractive optical element according to the third exemplary configuration are shown in FIGS. 14B and 14C, with different magnification levels. The measured sizes of the nanoantennas in the sample revealed smaller diameters of 225 nm and 150 nm on average for the larger and smaller cylinders, respectively, and a larger height of around 330 nm on average, due to fabrication inaccuracies.

Figure 15A:
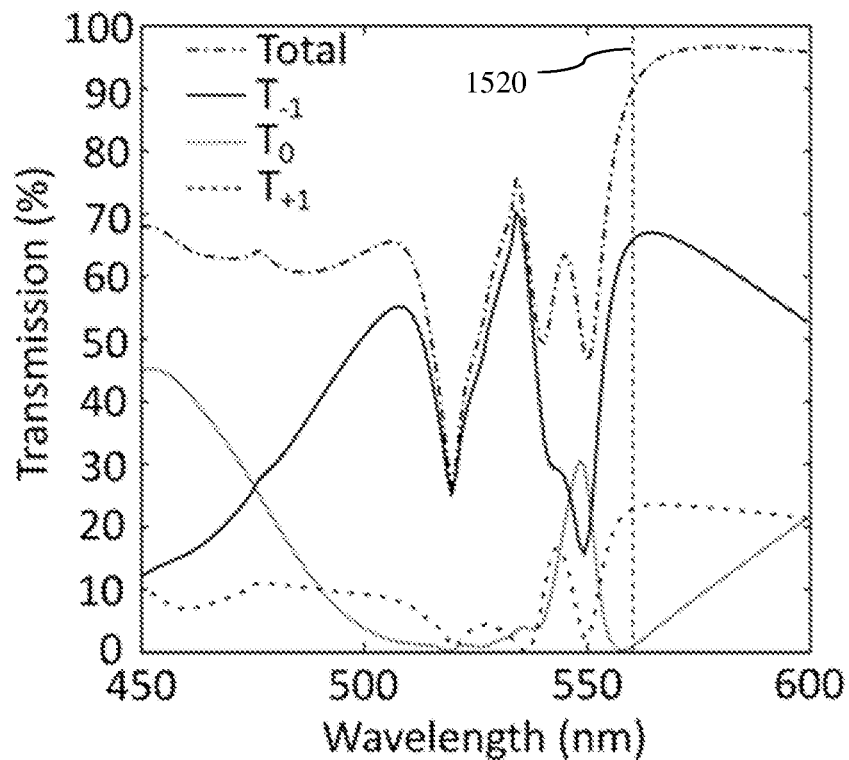
FIGS. 15A and 15B depict graphs showing the simulated transmission values and experimentally measured values, respectively, in transmission into $T_{-1}$, $T_0$ and $T_{+1}$ diffraction as a function of wavelength with respect to the diffractive optical element shown in FIG. 14A.
Figure 15B:
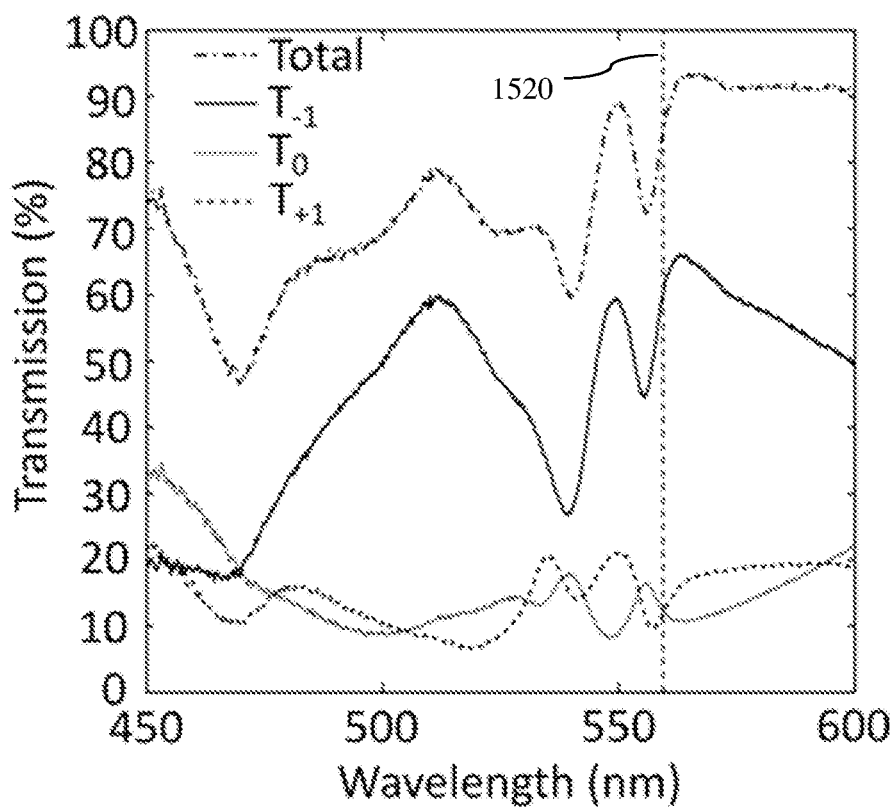

For the diffractive optical element 1400 according to the third exemplary configuration, to characterize the capacity of the diffractive optical element to concentrate the electromagnetic energy into the desired diffraction order, the transmission power into the different diffraction orders as a function of the wavelength was simulated and also measured experimentally based on the sample fabricated. The simulated results are plotted in FIG. 15A and the corresponding experimental results are plotted in FIG. 15B. The operating wavelength is indicated in both FIGS. 15A and 15B by a vertical dashed line 1520. It can be observed from FIGS. 15A and 15B that the simulated and experimental results have strong correspondence, except for a systematic redshift in the experimental results. This is understood to be due to the larger height of the cylinders in the fabricated sample. The general trends observed in the simulated curves are, however, well matched in the curves based on the experimental results.

Figure 15C:
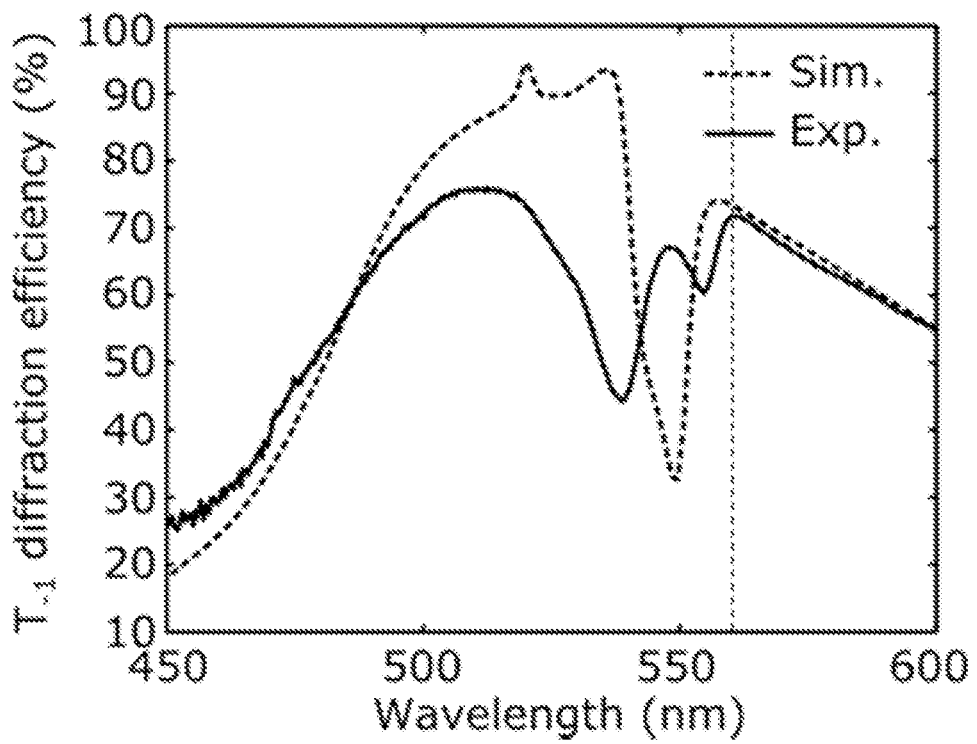
FIG. 15C depicts a graph plotting the simulated and experimentally measured transmitted diffraction efficiencies into the $T_{-1}$ diffraction order with respect to the diffractive optical element shown in FIG. 14A.

At the operating wavelength, the simulated transmission power into the different diffraction orders are $T_{-1}=65.51\%$, $T_0=8\%$ and $T_{+1}=22.83\%$, while the experimental transmission power into the different diffraction orders are $T_{-1}=62.9\%$, $T_0=11.8\%$ and $T_{+1}=12.7\%$. FIG. 15C depicts both the simulated and experimentally measured transmitted diffraction efficiencies into the $T_{-1}$ diffraction order. It can also be observed that the general correspondence between the simulated and experimentally measured transmitted diffraction efficiencies is strong. At the operating wavelength, the simulated transmitted diffraction efficiency is 73.49% and the experimentally measured transmitted diffraction efficiency is 71.95%.

In the third example embodiment, it should be noted that the value of the bending angle of about 51 degrees was chosen in such a way that it could be accurately measured by the experimental setup. However, such a bending angle is far from the higher bending angle that is achievable by the diffractive optical element according to various example embodiments of the present invention. For example, as illustrated hereinbefore in the first and second embodiments, bending angles of about 88 and 82 degrees can be achieved, along with high transmission and large scattering efficiencies, based on the configurations of the array of nanoantennas.

As described hereinbefore, the diffractive optical element according to various embodiments of the present invention may be applied or implemented to realize various optical devices or elements (components), such as, but not limited to, lenses, diffraction gratings, polarizers, polarization beam splitters, and so on, resulting in improved optical devices.

Figure 16A:
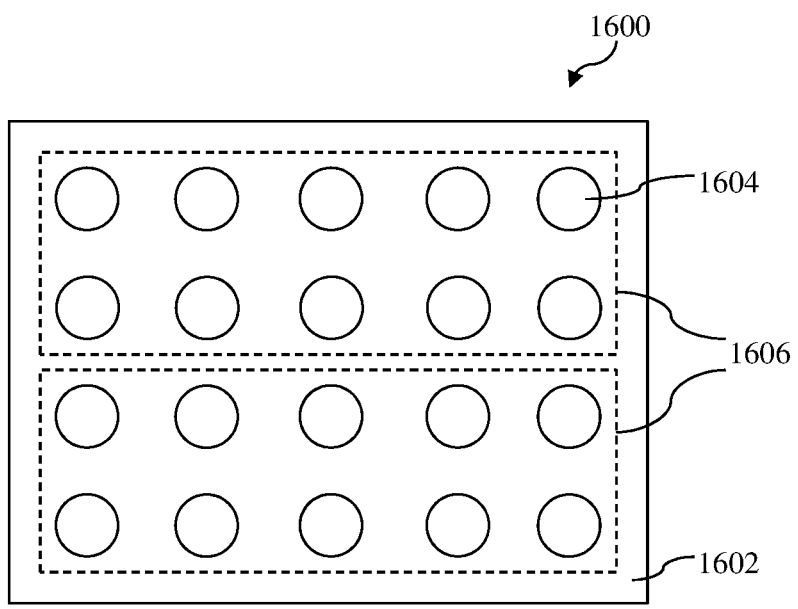
FIG. 16A depicts a schematic top view of a flat optical element according to various embodiments of the present invention.

In this regard, FIG. 16A depicts a schematic top view of a flat optical element 1600 comprising a substrate 1602, and an array of optical nanoantennas 1604 arranged on the substrate 1602 to form a plurality of zones 1606, each zone 1606 comprising a sub-array of optical nanoantennas spaced apart periodically in a lateral direction for supporting a corresponding plurality of diffraction orders at a predetermined wavelength. In the same or similar manner as described hereinbefore with respect to FIG. 2 for example, for each zone of the plurality of zones, each optical nanoantenna in the sub-array of optical nanoantennas of the respective zone 1606 is configured to control distribution of electromagnetic energy from an incident light (on the sub-array of optical nanoantennas) having the predetermined wavelength amongst the corresponding plurality of diffraction orders so as to promote scattering of the electromagnetic energy in at least a respective first direction and suppress scattering of the electromagnetic energy in at least a respective second direction, whereby the first respective direction and the second respective direction correspond to a first diffraction order and a second diffraction order of the corresponding plurality of diffraction orders, respectively.

In various embodiments, the first diffraction order and the second diffraction order may belong to the same order level, such as diffraction orders at opposing sides with respect to a zero diffraction order of the corresponding plurality of diffraction orders. For example, each zone 1606 of nanoantennas 1604 may be configured accordingly to control distribution of electromagnetic energy so as to promote scattering of the electromagnetic energy from that zone in one or more desired directions and to suppress scattering of the electromagnetic energy from that zone in one or more non-desired directions as appropriate for various purposes.

It will be appreciated to a person skilled in the art that the flat optical element 1600 is not limited to the configuration as shown in FIG. 16A, of which is schematically shown for illustration purpose only. For example, the array of nanoantennas on the substrate and the plurality of zones may be configured as appropriate for various purposes, such as but not limited to, a circular or a hexagonal configuration. Various numbers of nanoantennas in each zone may also be formed as appropriate.

Figure 1A:
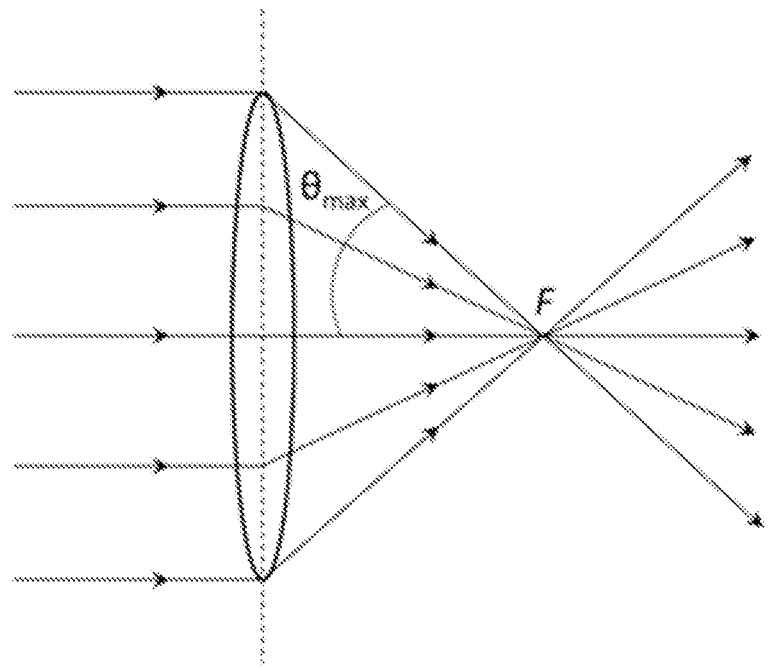
FIGS. 1A and 1B depict schematic drawings illustrating the operating principle of a conventional lens and a conventional flat-optics lens, respectively.
Figure 1B:
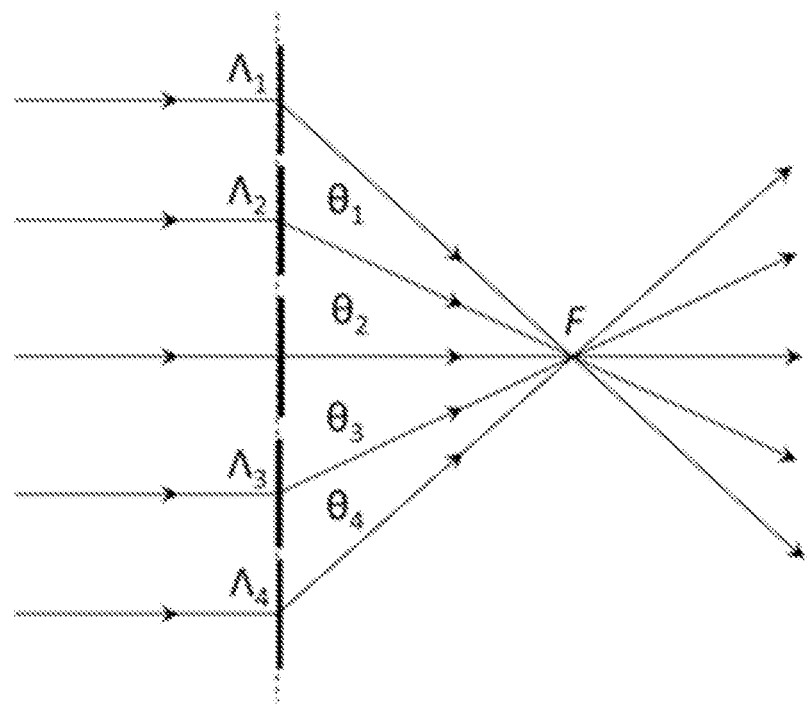
Figure 16B:
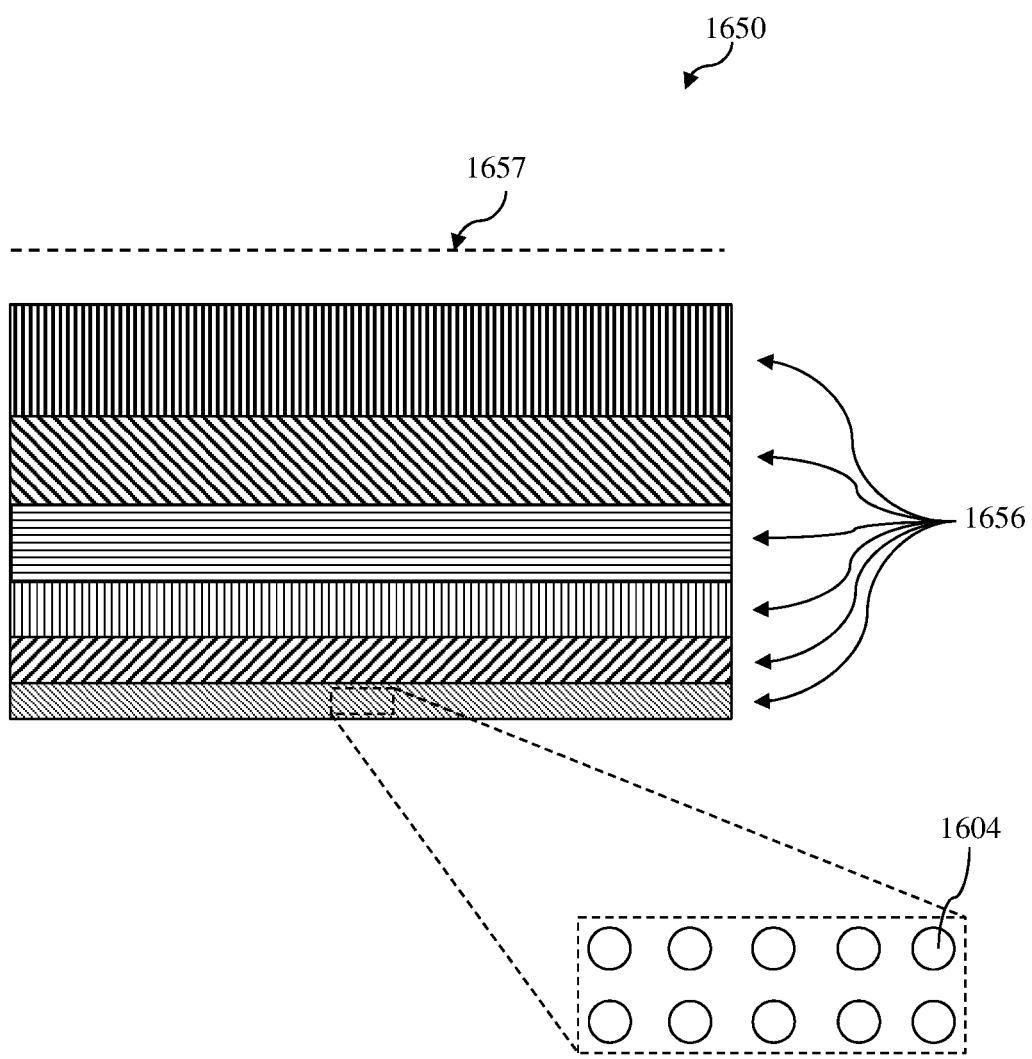
FIG. 16B depicts a schematic top view of another flat optical element according various embodiments of the present invention.
Figure 16C:
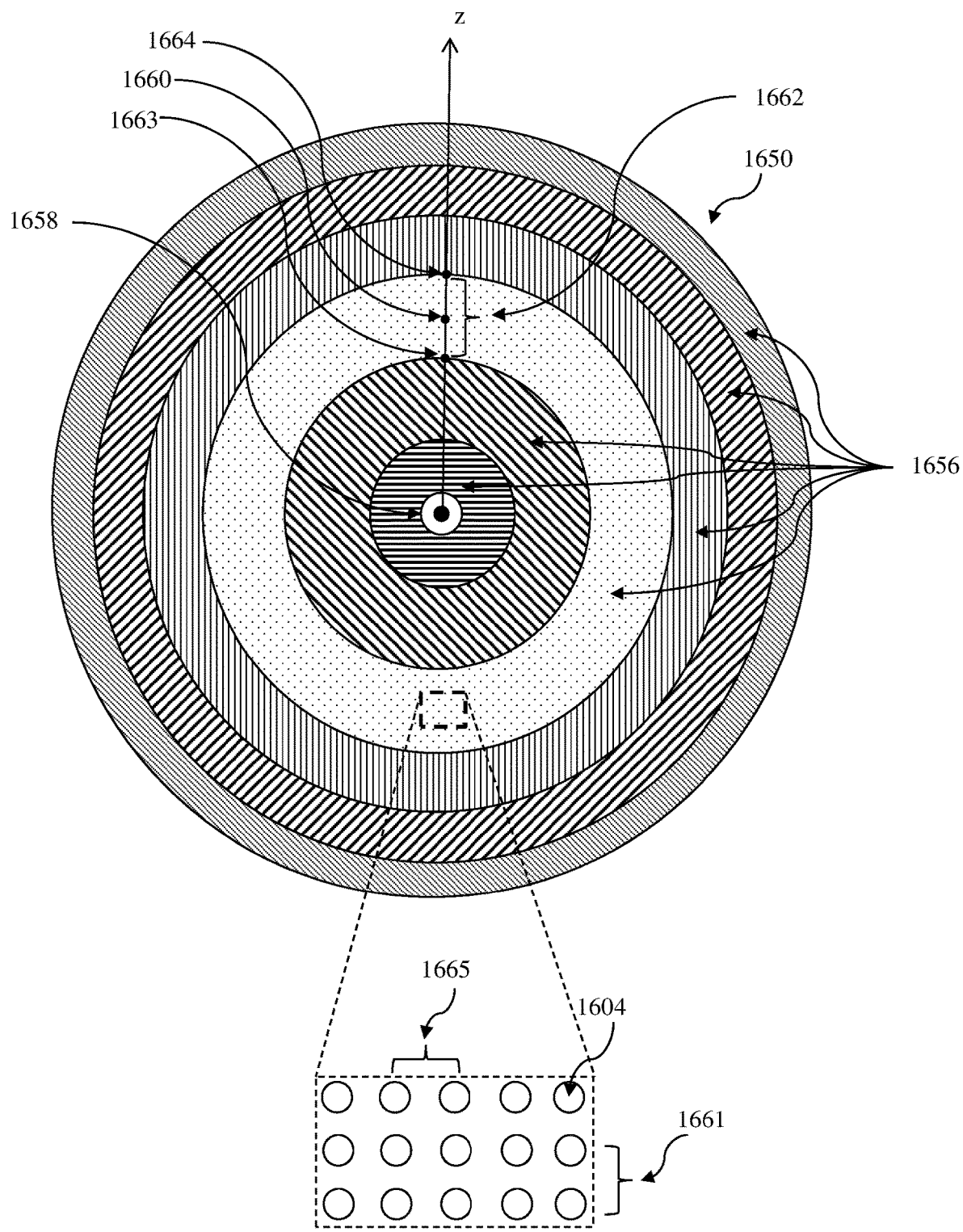
FIG. 16C depicts a schematic top view of a spherical flat optical lens according to an example embodiment of the present invention.

As an example, FIG. 16B depicts a schematic top view of a flat optical element 1650 whereby the plurality of zones may be a plurality of angular/annular or rectangular zones 1656. In particular, the sub-array of optical nanoantennas 1604 of the respective zone 1656 is configured such that an angle which the respective first direction makes with an axis or plane 1657 increases as the respective zone is further from the axis or plane 1657 (in other words, an angle which the respective first direction subtends the axis or plane 1657 increases as the respective zone is further from the axis or plane 1657) so as to focus the incident light towards the axis or plane 1657. For example, in the example of FIG. 16B, the plane 1657 is perpendicular to the page. For example, this covers the case of a cylindrical lens, in which there is not a focal point but a focal line, and whereby the different zones are rectangular instead of being annular as in the case of spherical lens as shown in FIG. 16C. In various embodiments, each optical nanoantenna 1604 in the sub-array of optical nanoantennas of the respective zone is configured to have substantially the same geometrical configuration. For example, such a configuration of the array of nanoantennas on the substrate may be applied to realize an optical lens that focuses an incident light towards an axis (e.g., such an optical lens may be referred to as spherical lens) or a plane (e.g., such an optical lens may be referred to as cylindrical lens), such as a central axis or plane, at a focal point or focal line (e.g., as shown schematically in FIG. 1B).

To demonstrate the effectiveness of the diffractive optical element according to various embodiments of the present invention in realizing various optical devices or elements, an example implementation of the diffractive optical element to realize a spherical flat optical lens will now be described according to a fourth example embodiment of the present invention as shown in FIG. 16C. In this regard, as will be shown later, the diffractive optical element with highly directional scattering pattern and exceptionally large maximum bending angle can advantageously be applied to realize a flat optical lens with significantly improved numerical aperture, such as an ultra-flat lens (thickness<$\lambda$/3) with ultra-high numerical aperture (NA>0.99).

In order to mimic a lens, the array of nanoantennas should efficiently concentrate the electromagnetic energy of the incident light into a desired diffraction order and suppress all others, thus bending the light beam into the particular angle corresponding to this desired diffraction order. Furthermore, such a particular angle should be different in the different regions/zones of the array in order to produce the focusing effect of a traditional lens.

As described hereinbefore, the numerical aperture of a lens is determined by the maximum bending angle achievable. In this fourth example embodiment, the nanoantennas 404 in zones requiring large bending angle are each formed by a pair of electromagnetically coupled silicon cylinders as described hereinbefore with respect to FIG. 4 to achieve a maximum bending angle of 82 degrees, leading to a numerical aperture of about 0.9903. The lens operating wavelength ($\lambda$) is fixed at 713.9 nm, it has a circular shape with a diameter ($D_{lens}$) of 600 µm and comprises a plurality of concentric angular zones that bend the light at different angles, concentrating the energy of the incoming light at the focal point, situated at a distance (f) of about 42.162 µm from the center of the lens. By way of example only and without limitation, the different zones of the lens are characterized by the set of parameters as specified in Table 1 shown below, namely, the bending angle ($\theta$) that the light experiences while transmitting through the zone, its central position 1660 ($z_0$) in the radial direction from the center 1658, the period ($\Delta z$) 1661 of the grating composing the zone, the number ($N_{periods}$) of those periods that span the zone with total size ($L_z$) in radial direction 1662, the lower limit 1663 ($z_{min}=z_0-0.5\times N_{periods}\times \Delta z$) and the upper limit 1664 ($z_{max}=z_0+0.5\times N_{periods}\times \Delta z$) of the zone in the radial direction, their approximate transmission and the lateral size 1665 (i.e., the distance with respect to the neighboring element in the zone in the tangential direction). It will be appreciated that the above-mentioned parameters are illustrated in FIG. 16C for only one of the zones of the lens, and that the notations for the rest of the zones are avoided for the sake of simplicity and clarity in FIG. 16C.

TABLE 1

Exemplary values of various parameters for different zones of the flat optical element according to the fourth example embodiment of the present invention

| $\theta$ (°) | $z_0$ (nm) | Period, $\Delta z$ (nm) | $N_{periods}$ | $z_{min}$ (nm) | $z_{max}$ (nm) | Approx. Transmission | Lateral size (nm) |
|---|---|---|---|---|---|---|---|
| 9.00 | 6675.0 | 4563.6 | 1 | 4393.2 | 8956.8 | 47.73 | 283 |
| 14.00 | 10507.8 | 2951.0 | 1 | 9032.3 | 11983.3 | 43.43 | 280 |
| 17.40 | 13207.3 | 2387.3 | 1 | 12013.6 | 14400.9 | 44.15 | 277 |

TABLE 1-continued

Exemplary values of various parameters for different zones of the flat optical element according to the fourth example embodiment of the present invention

| θ (°) | $z_0$ (nm) | Period, Δz (nm) | $N_{periods}$ | $z_{min}$ (nm) | $z_{max}$ (nm) | Approx. Transmission | Lateral size (nm) |
|---|---|---|---|---|---|---|---|
| 20.20 | 15506.1 | 2067.5 | 1 | 14472.4 | 16539.9 | 46.63 | 272 |
| 22.60 | 17543.0 | 1857.7 | 1 | 16614.2 | 18471.9 | 56.36 | 261 |
| 24.70 | 19384.3 | 1708.4 | 1 | 18530.0 | 20238.5 | 47.76 | 281.5 |
| 26.60 | 21104.4 | 1594.4 | 1 | 20307.2 | 21901.5 | 55.92 | 262 |
| 28.30 | 22692.4 | 1505.8 | 1 | 21939.5 | 23445.4 | 56.28 | 253 |
| 29.90 | 24234.1 | 1432.1 | 1 | 23518.1 | 24950.2 | 40.07 | 285 |
| 31.40 | 25725.1 | 1370.2 | 1 | 25040.0 | 26410.2 | 54.80 | 260 |
| 32.80 | 27160.2 | 1317.9 | 1 | 26501.3 | 27819.2 | 56.38 | 260 |
| 34.10 | 28533.9 | 1273.4 | 1 | 27897.2 | 29170.6 | 57.35 | 260 |
| 35.30 | 29839.9 | 1235.4 | 1 | 29222.2 | 30457.6 | 58.40 | 260 |
| 36.40 | 31071.5 | 1203.0 | 1 | 30470.0 | 31673.1 | 57.69 | 260 |
| 37.50 | 32338.6 | 1172.7 | 1 | 31752.2 | 32924.9 | 58.98 | 260 |
| 38.50 | 33523.2 | 1146.8 | 1 | 32949.8 | 34096.6 | 60.09 | 260 |
| 39.50 | 34741.2 | 1122.3 | 1 | 34180.0 | 35302.4 | 61.00 | 260 |
| 40.40 | 35867.7 | 1101.5 | 1 | 35317.0 | 36418.5 | 61.66 | 260 |
| 42.45 | 38550.6 | 1057.7 | 4 | 36435.2 | 40666.1 | 62.49 | 260 |
| 45.36 | 42677.4 | 1003.3 | 4 | 40670.7 | 44684.0 | 62.91 | 260 |
| 47.88 | 46609.4 | 962.5 | 4 | 44684.5 | 48534.4 | 63.41 | 260 |
| 50.10 | 50404.2 | 930.6 | 4 | 48543.0 | 52265.3 | 62.39 | 260 |
| 52.07 | 54078.5 | 905.1 | 4 | 52268.3 | 55888.6 | 60.06 | 260 |
| 53.84 | 57667.5 | 884.2 | 4 | 55899.0 | 59435.9 | 55.58 | 260 |
| 55.44 | 61171.7 | 866.9 | 4 | 59437.9 | 62905.6 | 45.29 | 260 |
| 56.89 | 64612.4 | 852.3 | 4 | 62907.7 | 66317.1 | 45.66 | 260 |
| 58.21 | 67998.5 | 839.9 | 4 | 66318.7 | 69678.3 | 45.76 | 260 |
| 59.43 | 71339.0 | 829.2 | 4 | 69680.7 | 72997.4 | 45.84 | 260 |
| 60.55 | 74641.9 | 819.8 | 4 | 73002.2 | 76281.6 | 45.87 | 260 |
| 61.59 | 77905.5 | 811.7 | 4 | 76282.1 | 79528.8 | 45.86 | 260 |
| 62.55 | 81138.4 | 804.5 | 4 | 79529.5 | 82747.3 | 45.74 | 260 |
| 63.45 | 84344.2 | 798.1 | 4 | 82748.1 | 85940.3 | 45.66 | 260 |
| 64.69 | 89100.9 | 789.7 | 8 | 85941.9 | 92259.8 | 45.56 | 260 |
| 66.16 | 95382.8 | 780.5 | 8 | 92260.9 | 98504.7 | 45.41 | 260 |
| 67.47 | 101600.1 | 772.9 | 8 | 98508.6 | 104691.7 | 45.11 | 260 |
| 68.64 | 107761.3 | 766.6 | 8 | 104695.1 | 110827.5 | 44.77 | 260 |
| 69.69 | 113876.2 | 761.2 | 8 | 110831.3 | 116921.1 | 44.43 | 260 |
| 70.64 | 119949.5 | 756.7 | 8 | 116922.7 | 122976.2 | 43.89 | 260 |
| 71.51 | 125992.9 | 752.8 | 8 | 122981.8 | 129004.1 | 43.43 | 260 |
| 72.29 | 132008.2 | 749.4 | 8 | 129010.6 | 135005.8 | 42.94 | 260 |
| 73.19 | 139483.5 | 745.8 | 12 | 135008.8 | 143958.1 | 42.55 | 260 |
| 74.15 | 148411.1 | 742.1 | 12 | 143958.8 | 152863.8 | 41.74 | 260 |
| 75.00 | 157298.3 | 739.1 | 12 | 152863.8 | 161732.8 | 40.99 | 260 |
| 75.89 | 167621.8 | 736.1 | 16 | 161732.8 | 173510.7 | 40.09 | 260 |
| 76.88 | 180841.8 | 733.0 | 20 | 173511.5 | 188172.1 | 39.02 | 260 |
| 77.83 | 195475.6 | 730.2 | 20 | 188172.6 | 202778.7 | 37.09 | 260 |
| 78.81 | 212967.8 | 727.7 | 28 | 202779.4 | 223156.2 | 35.35 | 260 |
| 79.88 | 236210.6 | 725.2 | 36 | 223157.4 | 249263.7 | 33.72 | 260 |
| 80.95 | 264446.2 | 722.9 | 42 | 249265.1 | 279627.3 | 31.82 | 260 |
| 82.00 | 299816.2 | 720.9 | 56 | 279630.5 | 300000.0 | 29.59 | 260 |

Figure 17A:
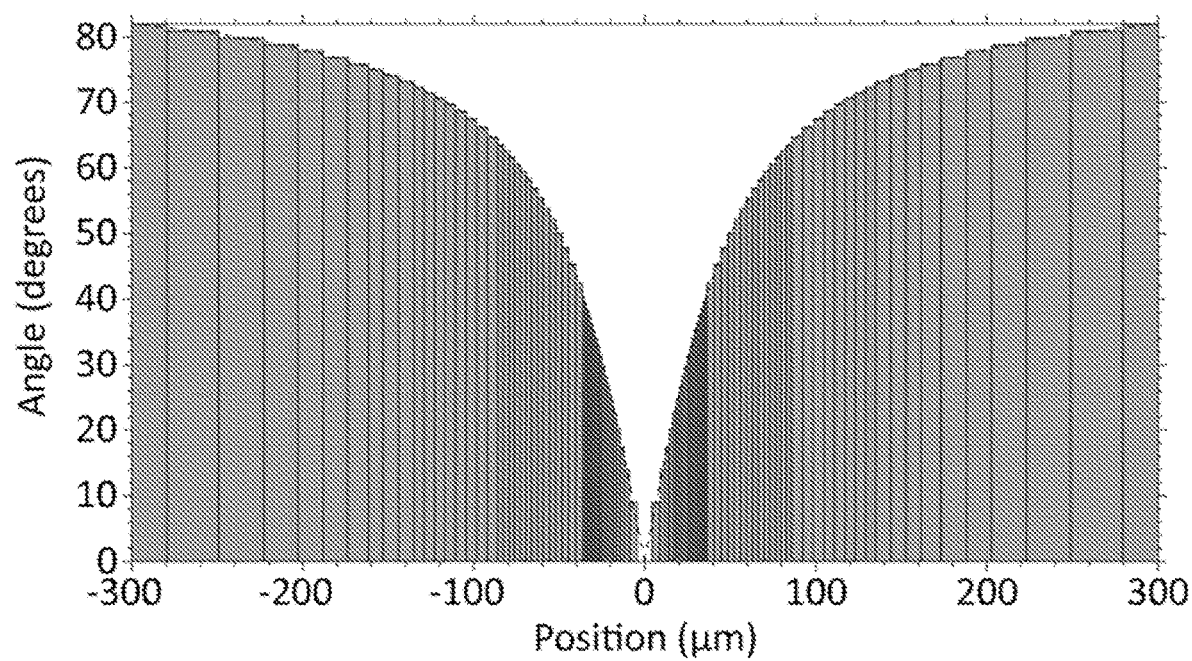
FIG. 17A illustrates a discretization of the spherical flat optical lens of FIG. 16C (having an exemplary configuration) operating at 713.9 nm wavelength into different zones, indicated by different bars with widths equal to the zone width and height equal to the corresponding bending angles.
Figure 17B:
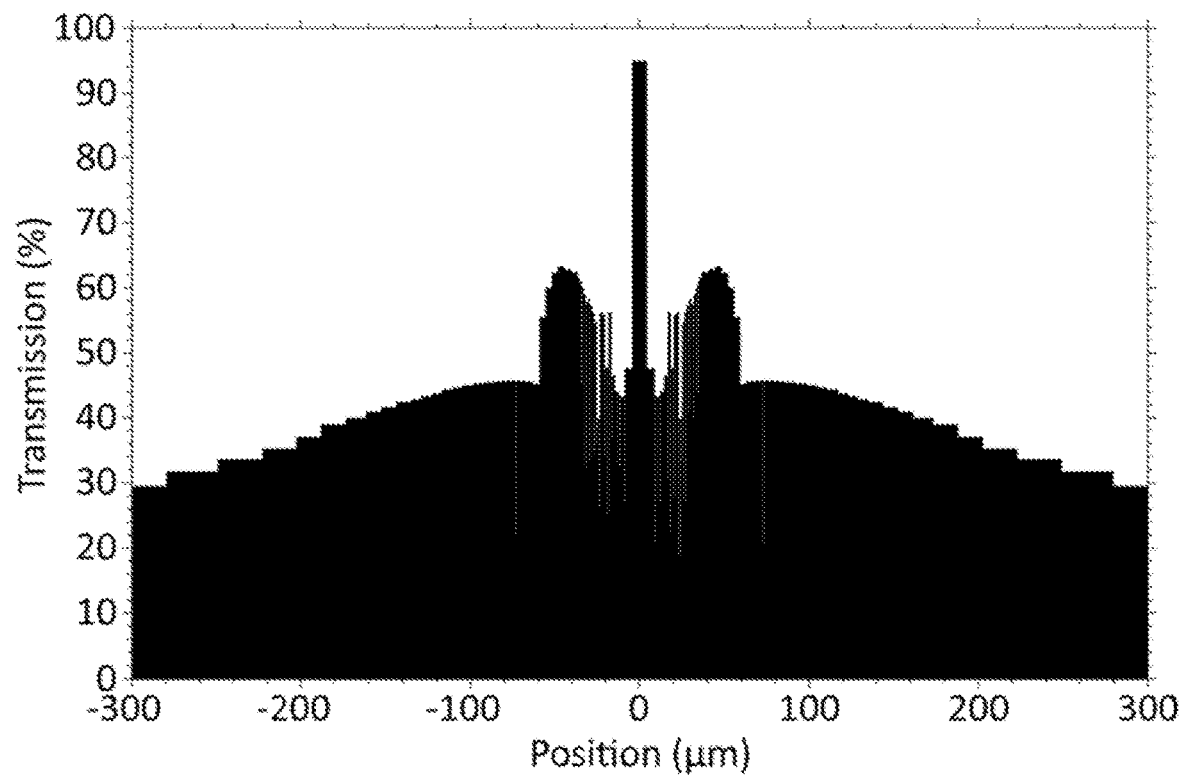
FIG. 17B shows a transmission profile of the spherical flat optical lens of FIG. 16C having the exemplary configuration.
Figure 18A:
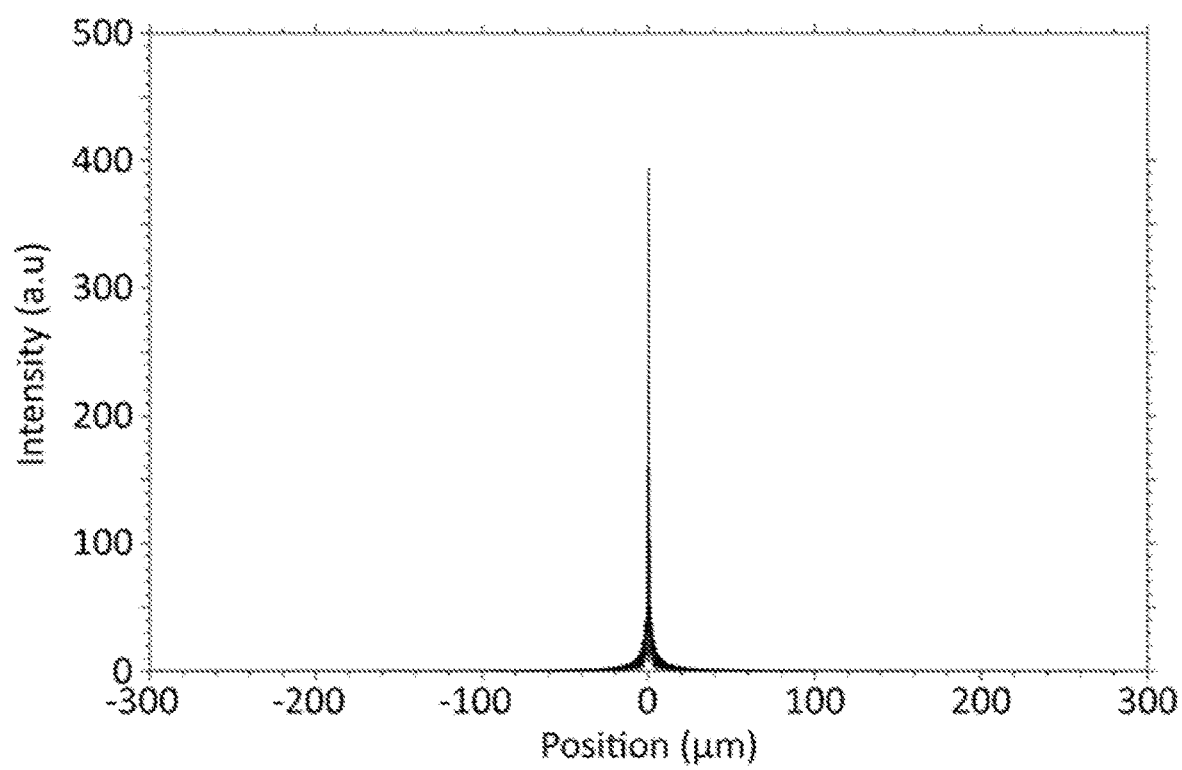
FIG. 18A shows a simulated intensity distribution in a cross-sectional cut at the focal plane along a line passing through the focal spot of the spherical flat optical lens of FIG. 16C at the operating wavelength of 713.9 nm.
Figure 18B:
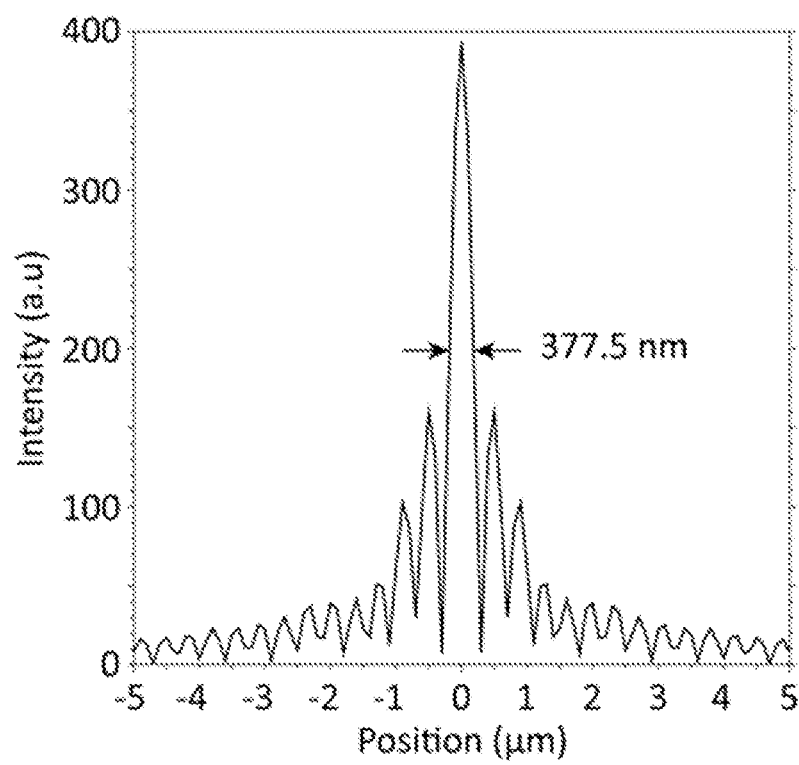
FIG. 18B shows an enlarged view of a region 10 µm wide around the focal spot of FIG. 18A.
Figure 18C:
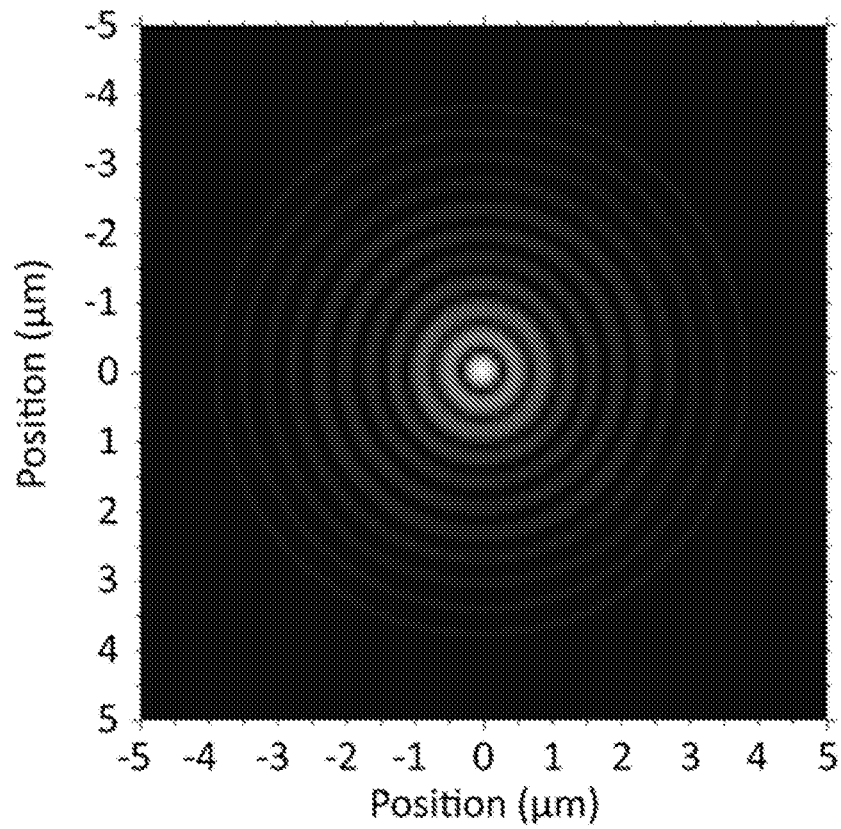
FIG. 18C shows a full intensity map at the focal plane in a region of 10 µm×10 µm around the focal spot.

In the fourth example embodiment, each zone is generated by rotation of the radial elements with an azimuthal angle such that the lateral size is preserved as much as possible. The approximation to the profile of the lens (relating the angle with the radial position) that results from the discretization of the lens into the different zones is plotted in FIG. 17A, with each bar having the width of the zone and the corresponding height of the bending angle. The ideal profile is represented in FIG. 17A by a dashed line. The calculated transmission profile of the lens, based on the transmission of the different gratings composing the lens, as will be explained below, is represented in FIG. 17B. Based on this profile, the focusing experienced by a wave transmitting through the lens is computed using the Rayleigh-Sommerfeld diffraction formula known in the art. The simulated field intensity distribution at the focal plane (perpendicular to the axis of the lens and passing through the focal point) in a cut along the x-axis (z=0) passing through the focus is plotted in FIG. 18A. An enlarged view of this distribution in a region of 10 μm around the focus is shown in FIG. 18B revealing a focal spot with a full width at half maximum (FWHM) of about 377.5 nm, closely approaching the theoretical limit for an ideal lens with the same numerical aperture, given by $\Delta=\lambda/(2 \cdot NA)=360.6$ nm. FIG. 18C shows the full intensity map in the focal plane in a region of 10 μm×10 μm around the focus.

For illustration purpose and by way of examples only, the configuration of the elements constituting the gratings at the different zones in the lens can be found by referring to the corresponding bending angle in Tables 2 to 5 shown below.

TABLE 2

Exemplary values of the configuration of each nanoantenna (having two coupled cylinders with respective diameters D1, D2) in different zones of the flat optical element and the associated optical properties/characteristics for angles in the range of about 49 to 87 degrees according to the fourth example embodiment of the present invention

| P1 (nm) | P2 (nm) | D1 (nm) | D2 (nm) | g (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver.) |
|---|---|---|---|---|---|---|---|---|---|---|---|
| 714.9 | 260 | 190 | 155 | 40 | 87.0 | 26.70 | 7.00 | 16.85 | 86.00 | 71.00 | 82.38 |
| 715.6 | 260 | 190 | 150 | 40 | 86.0 | 30.16 | 9.00 | 19.58 | 80.60 | 88.25 | 82.24 |
| 716.6 | 260 | 190 | 150 | 40 | 85.0 | 35.40 | 11.00 | 23.20 | 82.70 | 89.20 | 84.15 |
| 717.8 | 260 | 190 | 150 | 40 | 84.0 | 40.70 | 13.01 | 26.86 | 84.00 | 90.20 | 85.42 |
| 719.3 | 260 | 190 | 150 | 50 | 83.0 | 39.50 | 14.60 | 27.05 | 82.00 | 90.00 | 84.02 |
| 720.9 | 260 | 190 | 150 | 50 | 82.0 | 42.86 | 16.33 | 29.60 | 83.00 | 90.00 | 84.82 |
| 722.8 | 260 | 190 | 150 | 50 | 81.0 | 45.79 | 17.86 | 31.82 | 85.00 | 91.00 | 86.60 |
| 724.9 | 260 | 190 | 150 | 50 | 80.0 | 48.23 | 19.20 | 33.72 | 86.30 | 91.50 | 87.72 |
| 727.3 | 260 | 190 | 150 | 50 | 79.0 | 50.20 | 20.50 | 35.35 | 87.70 | 92.00 | 88.90 |
| 729.8 | 260 | 190 | 150 | 50 | 78.0 | 52.30 | 21.80 | 37.05 | 89.80 | 92.20 | 90.49 |
| 732.7 | 260 | 190 | 150 | 50 | 77.0 | 54.00 | 23.20 | 38.60 | 90.00 | 92.00 | 90.59 |
| 735.8 | 260 | 190 | 150 | 50 | 76.0 | 55.70 | 24.20 | 39.95 | 90.92 | 92.10 | 91.27 |
| 739.2 | 260 | 190 | 150 | 50 | 75.0 | 56.80 | 25.19 | 40.99 | 91.88 | 92.39 | 92.04 |
| 742.2 | 260 | 190 | 150 | 50 | 74.1 | 57.53 | 25.95 | 41.74 | 92.59 | 92.61 | 92.60 |
| 746.3 | 260 | 190 | 150 | 50 | 73.0 | 58.28 | 26.83 | 42.55 | 93.48 | 92.86 | 93.28 |
| 750.4 | 260 | 190 | 150 | 50 | 72.1 | 58.84 | 27.45 | 43.14 | 94.03 | 93.35 | 93.81 |
| 754.5 | 260 | 190 | 150 | 50 | 71.1 | 59.24 | 28.15 | 43.70 | 94.73 | 93.56 | 94.35 |
| 759.6 | 260 | 190 | 150 | 50 | 70.0 | 59.48 | 28.97 | 44.23 | 95.51 | 93.86 | 94.96 |
| 764.7 | 260 | 190 | 150 | 50 | 69.0 | 59.58 | 29.69 | 44.64 | 96.18 | 94.19 | 95.51 |
| 769.8 | 260 | 190 | 150 | 50 | 68.0 | 59.56 | 30.39 | 44.97 | 96.75 | 94.52 | 95.98 |
| 775.9 | 260 | 190 | 150 | 50 | 66.9 | 59.26 | 31.20 | 45.23 | 97.33 | 94.93 | 96.49 |
| 781.5 | 260 | 190 | 150 | 50 | 66.0 | 58.89 | 31.92 | 45.41 | 97.77 | 95.28 | 96.88 |
| 787.7 | 260 | 190 | 150 | 50 | 65.0 | 58.40 | 32.73 | 45.56 | 98.15 | 95.68 | 97.25 |
| 794.3 | 260 | 190 | 150 | 50 | 64.0 | 57.75 | 33.58 | 45.67 | 98.45 | 96.07 | 97.56 |
| 800.6 | 260 | 190 | 150 | 50 | 63.1 | 56.84 | 34.56 | 45.70 | 98.69 | 96.37 | 97.80 |
| 808.8 | 260 | 190 | 150 | 50 | 62.0 | 55.81 | 35.67 | 45.74 | 98.77 | 96.67 | 97.94 |
| 816.0 | 260 | 190 | 150 | 50 | 61.0 | 55.30 | 36.40 | 45.85 | 98.74 | 96.83 | 97.97 |
| 825.3 | 260 | 190 | 150 | 50 | 59.9 | 54.05 | 37.66 | 45.86 | 98.55 | 96.89 | 97.86 |
| 833.5 | 260 | 190 | 150 | 50 | 58.9 | 52.91 | 38.73 | 45.82 | 98.27 | 96.80 | 97.64 |
| 841.8 | 260 | 190 | 150 | 50 | 58.0 | 51.77 | 39.76 | 45.76 | 97.87 | 96.57 | 97.30 |
| 851.2 | 260 | 190 | 150 | 50 | 57.0 | 50.44 | 40.88 | 45.66 | 97.33 | 96.17 | 96.81 |
| 861.1 | 260 | 190 | 150 | 50 | 56.0 | 48.93 | 42.10 | 45.51 | 96.63 | 95.55 | 96.13 |
| 871.5 | 260 | 190 | 150 | 50 | 55.0 | 47.46 | 43.13 | 45.29 | 95.87 | 94.85 | 95.38 |
| 882.4 | 260 | 190 | 150 | 50 | 54.0 | 46.18 | 43.98 | 45.08 | 95.16 | 94.10 | 94.64 |
| 893.9 | 260 | 190 | 150 | 50 | 53.0 | 44.44 | 44.87 | 44.66 | 94.26 | 93.15 | 93.70 |
| 906.0 | 260 | 190 | 150 | 50 | 52.0 | 42.47 | 45.67 | 44.07 | 93.21 | 92.09 | 92.63 |
| 918.6 | 260 | 190 | 150 | 50 | 51.0 | 40.21 | 46.35 | 43.28 | 91.94 | 90.93 | 91.40 |
| 931.9 | 260 | 190 | 150 | 50 | 50.0 | 37.36 | 46.86 | 42.11 | 90.24 | 89.56 | 89.86 |
| 945.9 | 260 | 190 | 150 | 50 | 49.0 | 33.03 | 47.20 | 40.11 | 86.13 | 88.38 | 87.44 |

TABLE 3

Exemplary values of the configuration of each nanoantenna (having three coupled cylinders with respective diameters D1, D2, D3) in different zones of the flat optical element and the associated optical properties/characteristics for angles in the range of about 36 to 53 degrees according to the fourth example embodiment of the present invention

| P1 (nm) | P2 (nm) | D1 (nm) | D2 (nm) | D3 (nm) | g (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver.) |
|---|---|---|---|---|---|---|---|---|---|---|---|---|
| 893.9 | 260 | 190 | 150 | 130 | 50 | 53.00 | 68.59 | 49.18 | 58.88 | 82.27 | 91.31 | 85.82 |
| 906.0 | 260 | 190 | 150 | 130 | 50 | 52.00 | 70.38 | 49.74 | 60.06 | 84.17 | 92.20 | 87.32 |
| 918.6 | 260 | 190 | 150 | 130 | 50 | 51.00 | 72.10 | 50.64 | 61.37 | 86.43 | 93.08 | 89.05 |
| 931.9 | 260 | 190 | 150 | 130 | 50 | 50.00 | 73.30 | 51.50 | 62.40 | 88.11 | 93.78 | 90.36 |
| 945.9 | 260 | 190 | 150 | 130 | 50 | 49.00 | 74.16 | 52.36 | 63.26 | 89.38 | 94.40 | 91.39 |
| 960.6 | 260 | 190 | 150 | 130 | 50 | 48.00 | 73.69 | 53.14 | 63.41 | 90.47 | 94.66 | 92.17 |
| 976.1 | 260 | 190 | 150 | 130 | 50 | 47.00 | 73.03 | 53.85 | 63.44 | 91.83 | 93.12 | 92.37 |
| 992.4 | 260 | 190 | 150 | 130 | 50 | 46.00 | 70.92 | 55.07 | 62.99 | 91.58 | 94.19 | 92.71 |
| 1009.6 | 260 | 190 | 150 | 130 | 50 | 45.00 | 69.94 | 55.87 | 62.91 | 91.19 | 94.76 | 92.74 |
| 1027.7 | 260 | 190 | 150 | 130 | 50 | 44.00 | 68.95 | 56.62 | 62.79 | 90.64 | 95.03 | 92.57 |
| 1046.8 | 260 | 190 | 150 | 130 | 50 | 43.00 | 68.03 | 57.32 | 62.67 | 89.92 | 95.04 | 92.19 |
| 1066.9 | 260 | 190 | 150 | 130 | 50 | 42.00 | 67.17 | 57.82 | 62.49 | 89.09 | 94.78 | 91.63 |
| 1088.2 | 260 | 190 | 150 | 130 | 50 | 41.00 | 66.27 | 58.06 | 62.17 | 88.08 | 94.21 | 90.84 |
| 1110.6 | 260 | 190 | 150 | 130 | 50 | 40.00 | 65.22 | 58.11 | 61.66 | 86.90 | 93.29 | 89.80 |
| 1134.4 | 260 | 190 | 150 | 130 | 50 | 39.00 | 64.19 | 57.82 | 61.00 | 85.60 | 91.97 | 88.50 |

TABLE 3-continued

Exemplary values of the configuration of each nanoantenna (having three coupled cylinders with respective diameters D1, D2, D3) in different zones of the flat optical element and the associated optical properties/characteristics for angles in the range of about 36 to 53 degrees according to the fourth example embodiment of the present invention

| P1 (nm) | P2 (nm) | D1 (nm) | D2 (nm) | D3 (nm) | g (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver.) |
|---|---|---|---|---|---|---|---|---|---|---|---|---|
| 1159.6 | 260 | 190 | 150 | 130 | 50 | 38.00 | 63.01 | 57.19 | 60.10 | 84.07 | 90.25 | 86.90 |
| 1186.2 | 260 | 190 | 150 | 130 | 50 | 37.00 | 61.77 | 56.21 | 58.99 | 82.41 | 88.16 | 85.05 |
| 1214.6 | 260 | 190 | 150 | 130 | 50 | 36.00 | 60.38 | 55.00 | 57.69 | 80.52 | 85.78 | 82.94 |

TABLE 4

Exemplary values of the configuration of each nanoantenna (having four coupled cylinders with respective diameters D1, D2, D3, D4) in different zones of the flat optical element and the associated optical properties/characteristics for angles in the range of about 31 to 35 degrees according to the fourth example embodiment of the present invention

| P1 (nm) | P2 (nm) | D1 (nm) | D2 (nm) | D3 (nm) | D4 (nm) | g (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver) |
|---|---|---|---|---|---|---|---|---|---|---|---|---|---|
| 1244.6 | 260 | 190 | 150 | 130 | 110 | 60 | 35.00 | 58.00 | 58.80 | 58.40 | 83.90 | 87.90 | 85.87 |
| 1276.7 | 260 | 190 | 150 | 130 | 110 | 60 | 34.00 | 55.60 | 59.10 | 57.35 | 81.40 | 86.50 | 83.95 |
| 1310.8 | 260 | 190 | 150 | 130 | 120 | 60 | 33.00 | 54.76 | 58.00 | 56.38 | 83.60 | 84.00 | 83.81 |
| 1347.2 | 260 | 190 | 150 | 130 | 120 | 60 | 32.00 | 54.20 | 57.40 | 55.80 | 82.70 | 83.30 | 83.01 |
| 1386.1 | 260 | 190 | 150 | 130 | 120 | 60 | 31.00 | 53.40 | 56.20 | 54.80 | 81.10 | 82.50 | 81.81 |

TABLE 5

Exemplary values of the configuration of the unit cell of the arrays used in different zones of the flat optical element, in which the conventional phase mapping approach based on phase array particles is used, and the associated optical properties/characteristics for angles in the range of about 5 to 30 degrees according to the fourth example embodiment of the present invention

| P1 (nm) | P2 (nm) | N disks | D (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver.) |
|---|---|---|---|---|---|---|---|---|---|---|
| 1425.0 | 285 | 5 | 198.1, 178.0, 171.3, 140.2, 0.0 | 30.07 | 44.14 | 36.00 | 40.07 | 96.43 | 86.00 | 91.45 |
| 1475.0 | 295 | 5 | 198.1, 178.0, 171.3, 140.2, 0.0 | 28.95 | 36.33 | 32.48 | 34.41 | 87.20 | 81.20 | 84.26 |
| 1518.0 | 253 | 6 | 201.7, 190.3, 170.1, 151.7, 128.1, 50.0 | 28.05 | 58.92 | 53.64 | 56.28 | 88.96 | 85.36 | 87.21 |
| 1572.0 | 262 | 6 | 211.8, 190.3, 170.1, 151.7, 128.1, 50.0 | 27.01 | 55.84 | 56.00 | 55.92 | 90.74 | 90.40 | 90.57 |
| 1626.0 | 271 | 6 | 219.1, 190.3, 170.1, 151.7, 128.1, 50.0 | 26.04 | 51.22 | 54.03 | 52.63 | 89.34 | 91.62 | 90.50 |
| 1689.0 | 282 | 6 | 219.1, 190.3, 170.1, 151.7, 128.1, 50.0 | 25.00 | 46.00 | 49.53 | 47.76 | 85.24 | 88.42 | 86.86 |
| 1752.0 | 292 | 6 | 219.1, 190.3, 170.1, 151.7, 128.1, 50.0 | 24.05 | 40.83 | 44.43 | 42.63 | 79.55 | 84.55 | 82.08 |
| 1827.0 | 261 | 7 | 210.0, 197.4, 179.3, 162.5, 146.1, 123.3, 50.0 | 23.00 | 55.87 | 56.84 | 56.36 | 90.96 | 94.19 | 92.56 |
| 1904.0 | 272 | 7 | 220.0, 197.4, 179.3, 162.5, 146.1, 123.3, 50.0 | 22.02 | 50.68 | 57.21 | 53.95 | 89.92 | 94.98 | 92.53 |
| 1992.2 | 272 | 7 | 222.7, 197.4, 179.3, 162.5, 146.1, 123.3, 50.0 | 21.00 | 44.67 | 54.52 | 49.60 | 87.38 | 94.12 | 90.96 |
| 2087.4 | 272 | 7 | 222.7, 197.4, 179.3, 162.5, 146.1, 123.3, 50.0 | 20.0 | 39.78 | 53.48 | 46.63 | 83.59 | 93.00 | 88.74 |
| 2192.0 | 274 | 8 | 220.7, 203.5, 185.6, 170.1, 156.4, 141.7, 118.7, 50.0 | 19.0 | 50.84 | 56.02 | 53.43 | 89.21 | 92.66 | 90.99 |

TABLE 5-continued

Exemplary values of the configuration of the unit cell of the arrays used in different zones of the flat optical element, in which the conventional phase mapping approach based on phase array particles is used, and the associated optical properties/characteristics for angles in the range of about 5 to 30 degrees according to the fourth example embodiment of the present invention

| P1 (nm) | P2 (nm) | N disks | D (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver.) |
|---|---|---|---|---|---|---|---|---|---|---|
| 2310.2 | 277 | 8 | 227.1, 203.5, 185.6, 170.1, 156.4, 141.7, 118.7, 50.0 | 18.0 | 47.13 | 49.79 | 48.46 | 87.11 | 87.93 | 87.53 |
| 2440.0 | 277 | 8 | 227.1, 203.5, 185.6, 170.1, 156.4, 141.7, 118.7, 50.0 | 17.0 | 45.65 | 42.64 | 44.15 | 85.72 | 80.98 | 83.36 |
| 2589.9 | 280 | 9 | 229.7, 208.6, 190.3, 177.3, 164.2, 151.7, 137.7, 115.6, 50.0 | 16.0 | 46.78 | 49.09 | 47.94 | 88.15 | 86.75 | 87.43 |
| 2758.5 | 280 | 9 | 229.7, 208.6, 190.3, 177.3, 164.2, 151.7, 137.7, 115.6, 50.0 | 15.0 | 45.05 | 41.17 | 43.11 | 86.70 | 78.98 | 82.83 |
| 2950.0 | 280 | 10 | 223.9, 204.6, 190.8, 180.3, 170.7, 160.9, 151.4, 140.7, 121.8, 50.0 | 14.0 | 38.64 | 48.21 | 43.43 | 84.14 | 89.65 | 87.11 |
| 3173.5 | 280 | 11 | 226.1, 207.6, 194.2, 183.9, 175.0, 166.4, 157.2, 148.6, 138.1, 119.0, 50.0 | 13.0 | 43.46 | 49.11 | 46.29 | 88.37 | 90.27 | 89.37 |
| 3433.7 | 280 | 11 | 226.1, 207.6, 194.2, 183.9, 175.0, 166.4, 157.2, 148.6, 138.1, 119.0, 50.0 | 12.0 | 32.25 | 46.85 | 39.55 | 77.68 | 88.74 | 83.87 |
| 3741.4 | 280 | 13 | 229.3, 212.8, 200.0, 189.9, 181.8, 174.3, 167.1, 159.4, 152.2, 144.4, 133.9, 113.7, 50.0 | 11.0 | 44.76 | 49.88 | 47.32 | 88.85 | 90.31 | 89.61 |
| 4108.0 | 280 | 13 | 229.3, 212.8, 200.0, 189.9, 181.8, 174.3, 167.1, 159.4, 152.2, 144.4, 133.9, 113.7, 50.0 | 10.0 | 32.24 | 46.67 | 39.46 | 77.09 | 88.60 | 83.51 |
| 4560.0 | 283 | 16 | 232.4, 218.6, 206.6, 197.3, 189.4, 182.8, 176.6, 170.7, 164.8, 158.3, 152.6, 146.3, 139.0, 128.4, 107.6, 50.0 | 9.0 | 46.17 | 49.29 | 47.73 | 89.56 | 90.37 | 89.98 |
| 5120.0 | 283 | 16 | 232.4, 218.6, 206.6, 197.3, 189.4, 182.8, 176.6, 170.7, 164.8, 158.3, 152.6, 146.3, 139.0, 128.4, 107.6, 50.0 | 8.0 | 31.60 | 45.42 | 38.51 | 75.15 | 87.61 | 82.03 |
| 5840.0 | 284 | 20 | 233.2, 223.9, 213.7, 204.6, 197.3, 190.8, 185.4, 180.3, 175.4, 170.7, 165.9, 160.9, 155.9, 151.4, 146.3, 140.7, 133.3, 121.8, 100.6, 50.0 | 7.0 | 44.50 | 48.92 | 46.71 | 88.24 | 90.07 | 89.19 |
| 6816.0 | 284 | 24 | 234.0, 227.7, 218.6, 210.2, 203.3, 197.4, 191.8, 187.2, 182.8, 178.6, 174.7, 170.7, 166.7, 162.7, 158.3, 154.5, 150.6, 146.3, 141.8, 136.0, 128.4, 116.5, 95.3, 50.0 | 6.0 | 47.95 | 49.76 | 48.86 | 90.24 | 90.49 | 90.37 |
| 8190.0 | 290 | 28 | 237.9, 230.5, 222.0, 215.2, 208.1, 202.4, 197.3, 192.5, 188.4, 184.7, 181.0, 177.5, 174.1, 170.7, 167.3, 163.9, 160.2, 156.6, 153.5, 150.0, 146.3, | 5.0 | 43.77 | 45.84 | 44.81 | 87.48 | 88.20 | 87.85 |

TABLE 5-continued

Exemplary values of the configuration of the unit cell of the arrays used in different zones of the flat optical element, in which the conventional phase mapping approach based on phase array particles is used, and the associated optical properties/characteristics for angles in the range of about 5 to 30 degrees according to the fourth example embodiment of the present invention

| P1 (nm) | P2 (nm) | N disks | D (nm) | Angle (deg.) | $T_{-1}$ (%) (p-pol) | $T_{-1}$ (%) (s-pol) | $T_{-1}$ (%) (aver.) | Eff. (%) (p-pol) | Eff. (%) (s-pol) | Eff. (%) (aver.) |
|---|---|---|---|---|---|---|---|---|---|---|
| | | | 142.6, 137.7, 132.0, 124.0, 111.7, 90.6, 50.0 | | | | | | | |

According to example embodiments of the present invention, the response of the nanoantennas to the two possible orthogonal polarizations of the incident light, namely p-polarization and s-polarization, is considered. First, because of the rotational symmetry of the lens the elements will experience both polarizations even if linearly polarized light is used. Second, because a practical lens should work for unpolarized light, by far the most common illumination conditions. Therefore, in Tables 2 to 5, it can be found the optical characteristics (transmission and efficiency) for both polarizations independently, together with the averaged optical characteristics (representing the characteristics under unpolarized illumination). For the lens simulations, the transmission and efficiency for unpolarized light (corresponding to the averaged values in the tables) were used.

According to various example embodiments, for angles above about 50 degrees, the gratings may be formed by pairs of electromagnetically coupled cylinders with varying inter-particle gaps and different periodicities. For angles between about 36 and 50 degrees, the number of cylinders forming each nanoantenna may be increased to 3. For example, a reason to increase the number of cylinders may be because as the desired bending angle decreases, additional diffraction order(s) may be supported by the diffraction grating formed by the array of nanoantennas. Accordingly, the nanoantennas in these angular zones may need to be designed/configured to suppress scattering of electromagnetic energy into the corresponding direction(s) of these additional diffraction order(s). This may require an increasingly complex angle-suppressed scattering pattern from each nanoantenna, the inclusion of additional components/cylinders in the nanoantenna (unit-cell) may facilitate in achieving the required scattering pattern. In this whole range of angles (about 36 and 50 degrees), for example, the inter-particle gap (e.g., defined as the distance between the surfaces of two adjacent cylinders in the nanoantenna) and the dimensions of each cylinder may be kept constant and only the periodicity is varied. For example, as shown in Table 2, the inter-particle gap is set to about 50 nm and the individual diameters of the cylinders (D1, D2, and D3) are set to about 190 nm, 150 nm, and 130 nm, respectively. Furthermore, for angles below 30 degrees, the conventional approach of using phased array particles (e.g., as described in the background) may be used. For example, a reason to use the conventional approach may be that for small angles the number of diffraction orders supported by the nanoantenna arrays can be very large (e.g., greater than 10 for angles around 15 degrees) and designing a nanoantenna having the appropriate scattering pattern as to suppress all of these diffraction orders except for one may be cumbersome. Therefore, according to various embodiments of the present invention, for small bending angles (e.g., less than 30 degrees), it may be preferred, although not necessary, to use the phased array particles. For example, increasing cylinder sizes accumulate increasing phase delays, leading to the light bending in the device. The central region, corresponding to the zero angle bending, may be left empty, and has an associated efficiency of about 95%.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A diffractive optical element comprising:
a substrate made of a transparent material; and
an array of optical nanoantennas arranged on the substrate, the array of optical nanoantennas being spaced apart periodically in a lateral direction for supporting a plurality of diffraction orders at a predetermined wavelength,
wherein each optical nanoantenna in the array of optical nanoantennas is configured to control distribution of electromagnetic energy from an incident light transmitted through the substrate and illuminated on a side of the array of optical nanoantennas that is arranged on the substrate, the incident light having the predetermined wavelength amongst the plurality of diffraction orders so as to promote scattering of the electromagnetic energy in at least a first direction and suppress scattering of the electromagnetic energy in at least a second direction, the first direction and the second direction corresponding to a first diffraction order and a second diffraction order of the plurality of diffraction orders, respectively, and
wherein at least one optical nanoantenna in the array of optical nanoantennas comprises at least one of a semiconductor material and a dielectric material, and said at least one optical nanoantenna is configured on the substrate to support electric multipolar resonant modes and magnetic multipolar resonant modes.

2. The diffractive optical element according to claim 1, wherein said each optical nanoantenna is configured to promote scattering of the electromagnetic energy in at least the first direction and a third direction, and suppress scattering of the electromagnetic energy in at least the second direction and a fourth direction, the third direction and the fourth direction corresponding to a third diffraction order and a fourth diffraction order of the plurality of diffraction orders, respectively.

3. The diffractive optical element according to claim 1, wherein said each optical nanoantenna in the array of optical nanoantennas is configured to have substantially the same geometrical configuration.

4. The diffractive optical element according to claim 1, wherein said each optical nanoantenna is configured to exhibit constructive interference of the electromagnetic energy in the far-field in at least the first direction so as to enhance scattering efficiency of the electromagnetic energy in at least the first direction and to exhibit destructive interference of the electromagnetic energy in the far-field in at least the second direction so as to minimize scattering efficiency of the electromagnetic energy in at least the second direction.

5. The diffractive optical element according to claim 4, wherein said each optical nanoantenna is configured to have an asymmetrical shape, the asymmetrical shape being configured to facilitate the array of optical nanoantennas in exhibiting constructive interference of the electromagnetic energy in the far-field in at least the first direction and destructive interference of the electromagnetic energy in the far-field in at least the second direction.

6. The diffractive optical element according to claim 5, wherein said each optical nanoantenna is configured to comprise a first component having a ring shape and a second component having a cylinder shape, wherein the first and second components are configured to intersect each other.

7. The diffractive optical element according to claim 5, wherein said each optical nanoantenna is configured to comprise a first component having a cylinder shape and a second component having a cylinder shape spaced apart from the first component, wherein the first and second components are configured to have a different diameter.

8. The diffractive optical element according to claim 1, wherein the first direction has an angle with respect to a zero diffraction order in the range of about 30 to about 89 degrees.

9. The diffractive optical element according to claim 1, wherein the predetermined wavelength is selected from a visible range or an infrared range, and each optical nanoantenna has a dimension in said lateral direction that is less than the predetermined wavelength.

10. A method of forming a diffractive optical element, the method comprising:
providing a substrate made of a transparent material;
arranging an array of optical nanoantennas on the substrate, the array of optical nanoantennas being spaced apart periodically in a lateral direction for supporting a plurality of diffraction orders at a predetermined wavelength; and
configuring each optical nanoantenna in the array of optical nanoantennas to control distribution of electromagnetic energy from an incident light transmitted through the substrate and illuminated on a side of the array of optical nanoantennas that is arranged on the substrate, the incident light having the predetermined wavelength amongst the plurality of diffraction orders so as to promote scattering of the electromagnetic energy in at least a first direction and suppress scattering of the electromagnetic energy in at least a second direction, the first direction and the second direction corresponding to a first diffraction order and a second diffraction order of the plurality of diffraction orders, respectively,
wherein at least one optical nanoantenna in the array of optical nanoantennas comprises at least one of a semiconductor material and a dielectric material, and said at least one optical nanoantenna is configured on the substrate to support electric multipolar resonant modes and magnetic multipolar resonant modes.

11. The method according to claim 10, wherein said each optical nanoantenna is configured to promote scattering of the electromagnetic energy in at least the first direction and a third direction, and suppress scattering of the electromagnetic energy in at least the third direction and a fourth direction, the third direction and the fourth direction corresponding to a second diffraction order and a fourth diffraction order of the plurality of diffraction orders, respectively.

12. The method according to claim 10, wherein said each optical nanoantenna in the array of optical nanoantennas is configured to have substantially the same geometrical configuration.

13. The method according to claim 10, wherein said each optical nanoantenna is configured to exhibit constructive interference of the electromagnetic energy in the far-field in at least the first direction so as to enhance scattering efficiency of the electromagnetic energy in at least the first direction and to exhibit destructive interference of the electromagnetic energy in the far-field in at least the second direction so as to minimize scattering efficiency of the electromagnetic energy in at least the second direction.

14. The method according to claim 13, wherein said each optical nanoantenna is configured to have an asymmetrical shape, the asymmetrical shape configured to facilitate the array of optical nanoantennas in exhibiting constructive interference of the electromagnetic energy in the far-field in at least the first direction and destructive interference of the electromagnetic energy in the far-field in at least the second direction.

15. The method according to claim 14, wherein said each optical nanoantenna is configured to comprise a first component having a ring shape and a second component having a cylinder shape, wherein the first and second components are configured to intersect each other.

16. The method according to claim 14, wherein said each optical nanoantenna is configured to comprise a first component having a cylinder shape and a second component having a cylinder shape spaced apart from the first component, wherein the first and second components are configured to have a different diameter.

17. The method according to claim 10, wherein the first direction has an angle with respect to a zero diffraction order in the range of about 30 to about 89 degrees.

18. A flat optical element comprising:
a substrate made of a transparent material; and
an array of optical nanoantennas arranged on the substrate to form a plurality of zones, each zone comprising a sub-array of optical nanoantennas spaced apart periodically in a lateral direction for supporting a corresponding plurality of diffraction orders at a predetermined wavelength,
wherein, for each zone of the plurality of zones, each optical nanoantenna in the sub-array of optical nanoantennas of the respective zone is configured to control distribution of electromagnetic energy from an incident light transmitted through the substrate and illuminated on a side of the sub-array of optical nanoantennas that is arranged on the substrate, the incident light having the predetermined wavelength amongst the corresponding plurality of diffraction orders so as to promote scattering of the electromagnetic energy in at least a respective first direction and suppress scattering of the electromagnetic energy in at least a respective second direction, the first respective direction and the second respective direction corresponding to a first diffraction order and a second diffraction order of the corresponding plurality of diffraction orders, respectively, and wherein at least one optical nanoantenna in the sub-array of optical nanoantennas of the respective zone comprises at least one of a semiconductor material and a dielectric material, and said at least one optical nanoantenna is configured on the substrate to support electric multipolar resonant modes and magnetic multipolar resonant modes.

19. The flat optical element according to claim 18, wherein:

each optical nanoantenna in the sub-array of optical nanoantennas of the respective zone is configured to have substantially the same geometrical configuration;

the first diffraction order and the second diffraction order belong to the same order level at opposing sides with respect to a zero diffraction order; and the plurality of zones are a plurality of angular zones, and the sub-array of optical nanoantennas of the respective zone is configured such that an angle which the respective first direction makes with an axis increases as the respective zone is further from the axis for focusing the incident light towards the axis.

* * * * *